(12) United States Patent
Passey et al.

(10) Patent No.: US 10,860,547 B2
(45) Date of Patent: *Dec. 8, 2020

(54) DATA MOBILITY, ACCESSIBILITY, AND CONSISTENCY IN A DATA STORAGE SYSTEM

(71) Applicant: Qumulo, Inc., Seattle, WA (US)

(72) Inventors: Aaron Passey, Seattle, WA (US); Neal Fachan, Seattle, WA (US); Peter Godman, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/152,259

(22) Filed: Oct. 4, 2018

(65) Prior Publication Data

US 2019/0251065 A1 Aug. 15, 2019

Related U.S. Application Data

(63) Continuation of application No. 14/658,015, filed on Mar. 13, 2015, now Pat. No. 10,095,708.

(Continued)

(51) Int. Cl.
*G06F 16/185* (2019.01)
*G06F 16/23* (2019.01)
*G06F 9/46* (2006.01)

(52) U.S. Cl.
CPC ........... *G06F 16/185* (2019.01); *G06F 9/467* (2013.01); *G06F 16/2358* (2019.01)

(58) Field of Classification Search
CPC ......... G06F 11/1076; G06F 2211/1028; G06F 2211/104; G06F 11/2097; G06F 16/10;
(Continued)

(56) References Cited

U.S. PATENT DOCUMENTS 5,165,031 A 11/1992 Pruul et al.
5,319,773 A 6/1994 Britton et al.
(Continued)

FOREIGN PATENT DOCUMENTS

EP 1498829 A1 1/2005
WO 1999044145 A1 9/1999
WO 0072201 A1 11/2000

OTHER PUBLICATIONS

Office Communication for U.S. Appl. No. 14/595,043 dated Aug. 27, 2019, pp. 1-34.
(Continued)

*Primary Examiner* — Shyue Jiunn Hwa
(74) *Attorney, Agent, or Firm* — John W. Branch; Branch Partners PLLC

(57) ABSTRACT

A transactional block storage system is provided which is capable of supporting a single-phase commit for data writes specifying a protected storage unit. The storage system includes a data storage map that logically links the protected data storage unit to two or more block storage units associated with a layer of the protected data storage unit. The storage system also includes an address abstraction layer which translates write requests to the block storage units and resolves whether those write requests are atomically committed to the storage system in a single phase transaction. The address abstraction layer is further configured to detected when a block storage unit becomes unavailable during a transaction and create a cleaning kit for that block in order to prevent data loss. Additionally, the address abstraction layer facilitates moving, copying, and merging of block storage units without global locking in the storage system.

20 Claims, 26 Drawing Sheets

Related U.S. Application Data

(60) Provisional application No. 61/982,926, filed on Apr. 23, 2014, provisional application No. 61/982,931, filed on Apr. 23, 2014.

(58) Field of Classification Search
CPC ............ G06F 11/1435; G06F 11/1662; G06F 11/2056; G06F 11/2094; G06F 3/067; G06F 3/0617; G06F 3/0689; G06F 11/2089; G06F 3/0607; G06F 3/0619; G06F 3/0632; G06F 11/1044; G06F 11/108; G06F 11/1096; G06F 11/201; G06F 16/182; G06F 3/0604; G06F 3/0631; G06F 3/0635; G06F 3/064; G06F 3/0673; G06F 11/0796; G06F 11/1084; G06F 11/2069; G06F 11/2071; G06F 11/2092; G06F 12/1441; G06F 1/325; G06F 1/3256; G06F 1/3268; G06F 3/0625; G06F 3/0643; G06F 3/0665; G06F 9/466; G06F 11/1471; G06F 9/52; G06F 9/30036; G06F 9/30127; G06F 9/30145; G06F 9/3885; G06F 11/2033; G06F 12/0813; G06F 12/0828; G06F 13/16; G06F 2201/825; G06F 9/467; G06F 11/1443
See application file for complete search history.

(56) References Cited

U.S. PATENT DOCUMENTS

| | | | |
|---|---|---|---|
| 5,410,684 A | 4/1995 | Ainsworth et al. | |
| 5,410,719 A | 4/1995 | Shackleford | |
| 5,442,561 A | 8/1995 | Yoshizawa et al. | |
| 5,953,719 A | 9/1999 | Kleewein et al. | |
| 6,236,996 B1 | 5/2001 | Bapat et al. | |
| 6,385,641 B1 | 5/2002 | Jiang et al. | |
| 6,415,283 B1 | 7/2002 | Conklin | |
| 6,496,944 B1 | 12/2002 | Hsiao et al. | |
| 6,529,998 B1 | 3/2003 | Yochai et al. | |
| 6,772,435 B1 | 8/2004 | Thexton et al. | |
| 6,874,130 B1 | 3/2005 | Baweja et al. | |
| 6,892,211 B2 | 5/2005 | Hitz et al. | |
| 6,965,903 B1 | 11/2005 | Agarwal et al. | |
| 7,213,040 B1 | 5/2007 | Stokes et al. | |
| 7,636,743 B2 | 12/2009 | Erofeev | |
| 7,693,876 B2 | 4/2010 | Hackworth et al. | |
| 7,844,580 B2 | 11/2010 | Srivastava et al. | |
| 7,937,421 B2 | 5/2011 | Mikesell et al. | |
| 7,962,709 B2 | 6/2011 | Agrawal | |
| 8,027,827 B2 | 9/2011 | Bitar et al. | |
| 8,046,378 B1 | 10/2011 | Zhuge | |
| 8,108,429 B2 | 1/2012 | Sim-Tang et al. | |
| 8,296,312 B1 | 10/2012 | Leung et al. | |
| 8,364,648 B1 | 1/2013 | Sim-Tang | |
| 8,423,733 B1 | 4/2013 | Ozdemir | |
| 8,448,170 B2 | 5/2013 | Wipfel et al. | |
| 8,463,825 B1 | 6/2013 | Harty et al. | |
| 8,489,656 B2 | 7/2013 | Erofeev | |
| 8,504,733 B1 | 8/2013 | Iyer et al. | |
| 8,515,911 B1 | 8/2013 | Zhou | |
| 8,612,404 B2 | 12/2013 | Bone et al. | |
| 8,612,488 B1 | 12/2013 | Subramanya et al. | |
| 8,645,323 B2 | 2/2014 | Jackiewicz et al. | |
| 8,661,447 B1 | 2/2014 | Olliff et al. | |
| 8,776,050 B2 | 7/2014 | Plouffe et al. | |
| 8,782,655 B2 | 7/2014 | Blanding | |
| 8,806,154 B1 | 8/2014 | Gupta | |
| 8,838,887 B1 | 9/2014 | Burke et al. | |
| 8,838,931 B1 | 9/2014 | Marshak et al. | |
| 8,849,764 B1 | 9/2014 | Long et al. | |
| 8,868,797 B1 | 10/2014 | Kirac et al. | |
| 8,972,694 B1 | 3/2015 | Dolan et al. | |
| 9,015,214 B2 | 4/2015 | Nishida et al. | |
| 9,026,765 B1 | 5/2015 | Marshak et al. | |
| 9,047,017 B1 | 6/2015 | Dolan et al. | |
| 9,143,379 B1 | 9/2015 | Berger et al. | |
| 9,158,653 B2 | 10/2015 | Gold | |
| 9,171,145 B2 | 10/2015 | Dash | |
| 9,244,975 B2 | 1/2016 | Das et al. | |
| 9,244,976 B1 | 1/2016 | Zhang et al. | |
| 9,384,252 B2 | 7/2016 | Akirav et al. | |
| 9,501,487 B1 | 11/2016 | Yuan et al. | |
| 9,600,193 B2 | 3/2017 | Ahrens | |
| 9,753,782 B2 | 9/2017 | Fang et al. | |
| 9,753,932 B1 | 9/2017 | Brow et al. | |
| 9,785,377 B2 | 10/2017 | Shin et al. | |
| 10,140,185 B1 | 11/2018 | Lopez et al. | |
| 10,318,401 B2 | 6/2019 | Rothschilds | |
| 10,437,509 B1 | 10/2019 | Alexeev | |
| 2001/0039622 A1 | 11/2001 | Hitz et al. | |
| 2002/0083073 A1 | 6/2002 | Vaidya et al. | |
| 2002/0099691 A1 | 7/2002 | Lore et al. | |
| 2003/0033308 A1 | 2/2003 | Patel et al. | |
| 2003/0145009 A1 | 7/2003 | Forman et al. | |
| 2003/0177379 A1* | 9/2003 | Hori | H04L 9/083 713/193 |
| 2003/0182313 A1 | 9/2003 | Federwisch et al. | |
| 2004/0153479 A1* | 8/2004 | Mikesell | G06F 11/1096 |
| 2004/0255048 A1 | 12/2004 | Lev Ran et al. | |
| 2005/0015674 A1 | 1/2005 | Haugh | |
| 2005/0027748 A1 | 2/2005 | Kisley | |
| 2005/0091663 A1 | 4/2005 | Bagsby | |
| 2005/0114726 A1* | 5/2005 | Ouchi | G11B 20/1833 714/5.1 |
| 2005/0119996 A1 | 6/2005 | Ohata et al. | |
| 2005/0154866 A1 | 7/2005 | Steely, Jr. et al. | |
| 2005/0195660 A1 | 9/2005 | Kavuri et al. | |
| 2005/0223019 A1 | 10/2005 | Das | |
| 2006/0004890 A1 | 1/2006 | Semple et al. | |
| 2006/0053139 A1 | 3/2006 | Marzinski et al. | |
| 2006/0089982 A1 | 4/2006 | Abbott et al. | |
| 2006/0123005 A1 | 6/2006 | Burnett et al. | |
| 2006/0173842 A1 | 8/2006 | Horvitz et al. | |
| 2006/0271604 A1 | 11/2006 | Shoens | |
| 2007/0011302 A1* | 1/2007 | Groner | H04L 67/10 709/224 |
| 2007/0027985 A1 | 2/2007 | Ramany et al. | |
| 2007/0100855 A1 | 5/2007 | Kohl | |
| 2007/0118561 A1 | 5/2007 | Idicula et al. | |
| 2008/0028006 A1 | 1/2008 | Liu et al. | |
| 2008/0059399 A1 | 3/2008 | DeLorme et al. | |
| 2008/0059541 A1 | 3/2008 | Fachan et al. | |
| 2008/0082593 A1 | 4/2008 | Komarov et al. | |
| 2008/0172366 A1 | 7/2008 | Hannel et al. | |
| 2008/0228772 A1 | 9/2008 | Plamondon | |
| 2008/0250357 A1 | 10/2008 | Lee et al. | |
| 2008/0256474 A1 | 10/2008 | Chakra et al. | |
| 2008/0270469 A1 | 10/2008 | Myerson et al. | |
| 2008/0270928 A1 | 10/2008 | Chakra et al. | |
| 2008/0282244 A1 | 11/2008 | Wu et al. | |
| 2008/0288306 A1 | 11/2008 | MacIntyre et al. | |
| 2008/0301256 A1 | 12/2008 | McWilliams et al. | |
| 2008/0313217 A1 | 12/2008 | Dunsmore et al. | |
| 2009/0077087 A1 | 3/2009 | Urano et al. | |
| 2009/0138500 A1 | 5/2009 | Yuan et al. | |
| 2009/0199190 A1 | 8/2009 | Chen et al. | |
| 2009/0222509 A1 | 9/2009 | King et al. | |
| 2009/0274047 A1 | 11/2009 | Kruys et al. | |
| 2009/0319566 A1 | 12/2009 | Wald et al. | |
| 2010/0036895 A1 | 2/2010 | Boyd et al. | |
| 2010/0088317 A1 | 4/2010 | Bone et al. | |
| 2010/0161557 A1 | 6/2010 | Anderson et al. | |
| 2010/0179959 A1 | 7/2010 | Shoens | |
| 2010/0217948 A1 | 8/2010 | Mason et al. | |
| 2010/0241668 A1 | 9/2010 | Susanto et al. | |
| 2010/0287512 A1 | 11/2010 | Gan et al. | |
| 2011/0039622 A1 | 2/2011 | Levenson | |
| 2011/0066668 A1 | 3/2011 | Guarraci | |
| 2011/0125799 A1 | 5/2011 | Kandasamy et al. | |
| 2011/0125973 A1 | 5/2011 | Lev et al. | |
| 2011/0161381 A1 | 6/2011 | Wang et al. | |
| 2011/0196833 A1 | 8/2011 | Drobychev et al. | |

(56) References Cited

U.S. PATENT DOCUMENTS

| | | |
|---|---|---|
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0166478 A1 | 6/2012 | Das et al. |
| 2012/0204060 A1 | 8/2012 | Swift et al. |
| 2012/0317079 A1 | 12/2012 | Shoens et al. |
| 2013/0019072 A1* | 1/2013 | Strasser ............... G06F 3/0673 711/154 |
| 2013/0091168 A1 | 4/2013 | Bhave et al. |
| 2013/0191355 A1 | 7/2013 | Bone et al. |
| 2013/0227236 A1 | 8/2013 | Flynn et al. |
| 2013/0311454 A1 | 11/2013 | Ezzat |
| 2013/0318194 A1 | 11/2013 | Timbs |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0258609 A1 | 9/2014 | Cui et al. |
| 2014/0280485 A1 | 9/2014 | Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0193347 A1 | 7/2015 | Kluesing et al. |
| 2015/0215405 A1 | 7/2015 | Baek et al. |
| 2015/0234879 A1 | 8/2015 | Baldwin et al. |
| 2015/0242263 A1 | 8/2015 | Klose |
| 2015/0278282 A1 | 10/2015 | Sardina et al. |
| 2016/0034356 A1 | 2/2016 | Aron et al. |
| 2016/0139836 A1 | 5/2016 | Nallathambi et al. |
| 2016/0224430 A1 | 8/2016 | Long et al. |
| 2016/0246816 A1 | 8/2016 | Abiri et al. |
| 2016/0306810 A1 | 10/2016 | Ni |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0046143 A1 | 2/2017 | Kochhar et al. |
| 2017/0091046 A1 | 3/2017 | Bangalore et al. |
| 2017/0123883 A1 | 5/2017 | Hall |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0286455 A1 | 10/2017 | Li et al. |
| 2017/0316321 A1 | 11/2017 | Whitney et al. |
| 2017/0344905 A1 | 11/2017 | Hack |
| 2018/0040029 A1 | 2/2018 | Zeng et al. |
| 2018/0288057 A1 | 10/2018 | Varadamma |
| 2018/0314423 A1 | 11/2018 | Gong et al. |
| 2019/0095112 A1 | 3/2019 | Lingarajappa |
| 2019/0163591 A1 | 5/2019 | Ouyang et al. |
| 2020/0004977 A1 | 1/2020 | Araujo et al. |

OTHER PUBLICATIONS

International Search Report and Written Opinion for application PCT/US2016038242 dated Oct. 11, 2016, pp. 1-11.
Office Communication for U.S. Appl. No. 15/957,809 dated Jan. 24, 2019, pp. 1-28.
Office Communication for U.S. Appl. No. 16/262,756 dated Aug. 5, 2019, pp. 1-48.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/004,208 dated Aug. 27, 2018, pp. 1-11.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 15/473,051 dated Jun. 30, 2017, pp. 1-22.
European Search Report for European Application 18155779.4 dated Apr. 17, 2018, pp. 1-15.
Office Communication for U.S. Appl. No. 16/004,182 dated Aug. 23, 2018, pp. 1-46.
Office Communication for U.S. Appl. No. 16/004,182 dated Mar. 5, 2019, pp. 1-46.
Office Communication for U.S. Appl. No. 16/004,182 dated Jul. 3, 2019, pp. 1-50.
Office Communication for U.S. Appl. No. 15/694,604 dated Jun. 3, 2019, pp. 1-14.
Office Communication for U.S. Appl. No. 16/004,182 dated May 22, 2019, pp. 1-6.
Office Communication for U.S. Appl. No. 14/595,043 dated Jun. 7, 2019, pp. 1-29.
Office Communication for U.S. Appl. No. 15/831,236 dated Mar. 30, 2018, pp. 1-8.
Office Communication for U.S. Appl. No. 15/831,236 dated Aug. 15, 2018, pp. 1-27.
Office Communication for U.S. Appl. No. 15/694,604 dated Nov. 20, 2019, pp. 1-24.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Jun. 26, 2019, pp. 1-66.
Office Communication for U.S. Appl. No. 14/859,114 dated Sep. 13, 2019, pp. 1-8.
Office Communication for U.S. Appl. No. 14/859,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, pp. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 16/752,509 dated Apr. 2, 2020, pp. 1-42.

(56) References Cited

OTHER PUBLICATIONS

Office Communication for U.S. Appl. No. 16/152,277 dated Apr. 3, 2020, pp. 1-10.
Office Communication for U.S. Appl. No. 15/474,047 dated Aug. 15, 2018, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
Extended European Search Report for European Application 17206518.7 dated Apr. 5, 2018, pp. 1-8.
Karatza et al. Epoch load sharing in a network of workstations, Simulation Symposium, 2001. Proceedings. 34th Annual Apr. 22-26, 2001, Piscataway, NJ, USA, IEEE, Apr. 22, 2001 (Apr. 22, 2001), pp. 36-42, XP010541274, ISBN: 978-0-7695-1092-7.
Extended European Search Report for European Application 18155779.4 dated Apr. 17, 2018, pp. 1-15.
Office Communication for U.S. Appl. No. 16/004,182 dated Jan. 7, 2020, pp. 1-54.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/262,790 dated Dec. 12, 2019, pp. 1-23.
Office Communication for U.S. Appl. No. 16/234,334 dated Jan. 16, 2020, pp. 1-8.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.
Office Communication for U.S. Appl. No. 16/262,790 dated Feb. 6, 2020, pp. 1-8.
Office Communication for U.S. Appl. No. 14/859,114 dated Mar. 13, 2020, pp. 1-22.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/228,716 dated Jun. 24, 2019, pp. 1-28.
Office Communication for U.S. Appl. No. 16/226,587 dated Aug. 5, 2019, pp. 1-54.
Office Communication for U.S. Appl. No. 16/231,354 dated Jul. 10, 2019, pp. 1-16.
Office Communication for U.S. Appl. No. 15/967,499 dated Jun. 27, 2018, pp. 1-25.
Office Communication for U.S. Appl. No. 16/226,587 dated Feb. 25, 2019, pp. 1-65.
Office Communication for U.S. Appl. No. 16/228,716 dated Feb. 28, 2019, pp. 1-28.
Office Communication for U.S. Appl. No. 16/231,354 dated Mar. 25, 2019, pp. 1-19.
Office Communication for U.S. Appl. No. 16/262,756 dated Apr. 2, 2019, pp. 1-40.
Office Communication for U.S. Appl. No. 16/004,182 dated Mar. 23, 2020, pp. 1-6.
Office Communication for U.S. Appl. No. 16/234,395 dated Mar. 28, 2019, pp. 1-36.
Kappes et al. "Dike: Virtualization-aware Access Control for Multitenant Filesystems", Feb. 18, 2013, pp. 1-6.
Hitz et al. "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 16/234,334 dated Oct. 11, 2019, pp. 1-22.
Office Communication for U.S. Appl. No. 14/859,114 dated Jul. 24, 2017, pp. 1-49.
Office Communication for U.S. Appl. No. 14/595,598 dated Dec. 15, 2017, pp. 1-18.
Office Communication for U.S. Appl. No. 14/658,015 dated Jan. 4, 2018, pp. 1-28.
Office Communication for U.S. Appl. No. 14/859,114 dated Feb. 21, 2018, pp. 1-25.
Office Communication for U.S. Appl. No. 14/595,043 dated May 4, 2017, pp. 1-30.
Office Communication for U.S. Appl. No. 14/595,043 dated May 25, 2018, pp. 1-5.
Office Communication for U.S. Appl. No. 14/595,043 dated Feb. 23, 2018, pp. 1-16.
Office Communication for U.S. Appl. No. 14/595,598 dated Feb. 24, 2017, pp. 1-8.
Office Communication for U.S. Appl. No. 14/658,015 dated Apr. 27, 2017, pp. 1-7.
Office Communication for U.S. Appl. No. 14/859,114 dated May 11, 2018, pp. 1-5.
Office Communication for U.S. Appl. No. 14/595,598 dated Apr. 19, 2018, pp. 1-3.
Office Communication for U.S. Appl. No. 14/859,114 dated Jun. 27, 2018, pp. 1-39.
Office Communication for U.S. Appl. No. 14/595,043 dated Oct. 5, 2018, pp. 1-17.
Office Communication for U.S. Appl. No. 14/658,015 dated Jul. 13, 2018, pp. 1-14.
Office Communication for U.S. Appl. No. 14/595,598 dated Sep. 20, 2018, pp. 1-18.
Office Communication for U.S. Appl. No. 15/957,809 dated Jun. 28, 2018, pp. 1-33.
Office Communication for U.S. Appl. No. 14/859,114 dated Jun. 26, 2019, pp. 1-27.
Office Communication for U.S. Appl. No. 14/595,598 dated Jul. 31, 2019, pp. 1-5.

\* cited by examiner

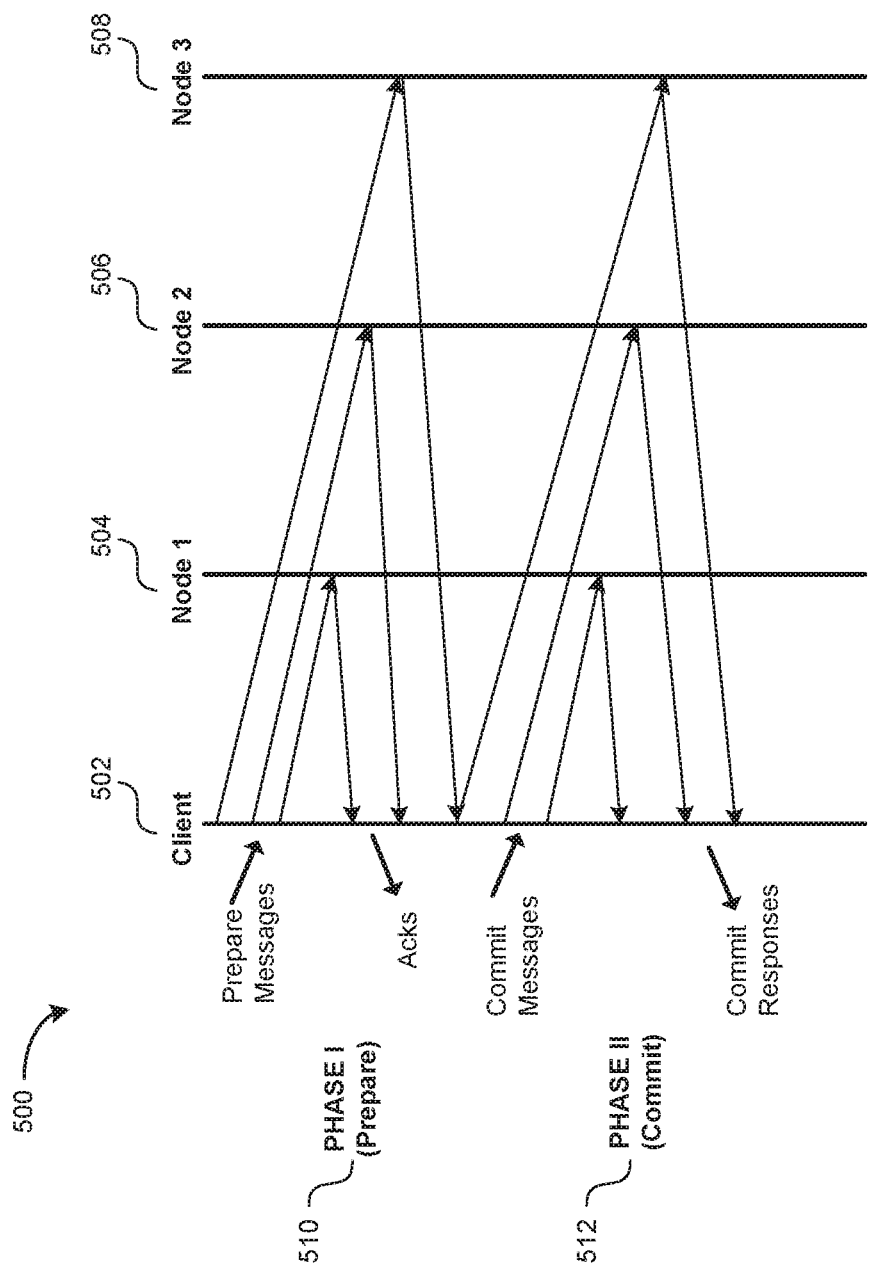

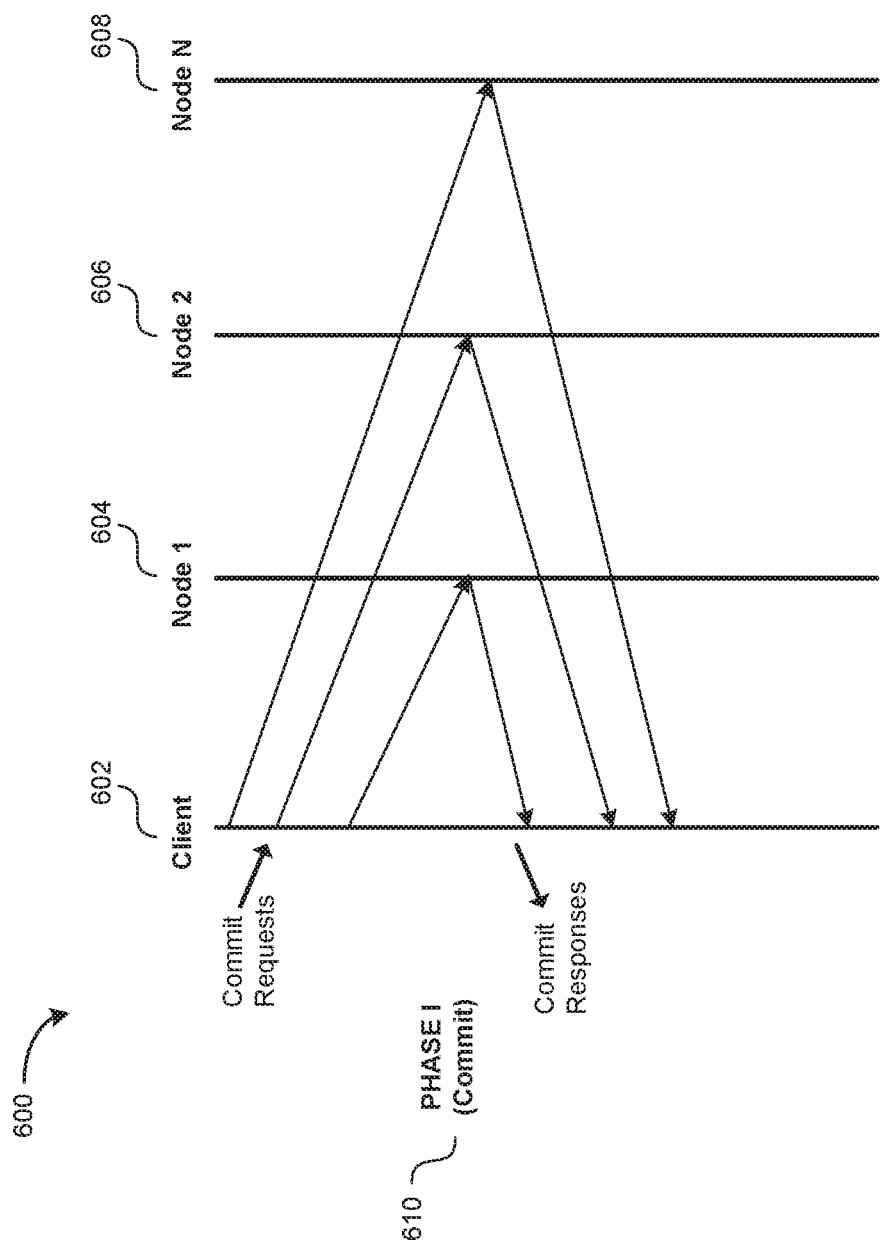

DATA MOBILITY, ACCESSIBILITY, AND CONSISTENCY IN A DATA STORAGE SYSTEM

CROSS-REFERENCE TO RELATED APPLICATION(S)

This Utility patent application is a Continuation of U.S. patent application Ser. No. 14/658,015 filed on Mar. 13, 2015, now U.S. Pat. No. 10,095,708 issued on Oct. 9, 2018, which is based on previously filed U.S. Provisional Patent Application Nos. 61/982,926 and 61/982,931, both filed on Apr. 23, 2014, the benefit of the filing dates of which are claimed under 35 U.S.C § 120 and § 119(e), and the contents of which are each further incorporated in entirety by reference.

TECHNICAL FIELD

The described technology is directed to data access, consistency, mobility, and modification in the field of data storage systems, including file systems.

BACKGROUND

The demand for scalable storage resources and the ability to provide rapid access to content stored thereby is a key concern to end-users. Enterprises, businesses, and individuals alike now use large scale systems to store data that is remotely accessible via a network. Such systems are often accessible via closed (e.g., enterprise) and open (e.g., Internet) networks and allow concurrent access via multiple client devices. Various implementations of large scale systems relying on network access have been developed. In each implementation, the systems are subject to system backups, hardware updates, and hardware failure.

In order to protect data from loss due to, for example, hardware failures, a technique called "mirroring" is sometimes used: two or more physical copies of the data are maintained in two or more physical locations, such as on differing hardware storage devices. This may be done using a variety of techniques providing associated logical addresses to those copies, such as mirrored discs, RAID systems, and other similar techniques implemented in networked data storage system.

BRIEF DESCRIPTION OF THE DRAWINGS

FIG. 5 shows a diagram representing a transaction made in a two-phase commit of write requests on nodes.

FIG. 6A shows a diagram representing a transaction made in a single-phase commit of write requests on nodes.

DETAILED DESCRIPTION

The inventors have recognized significant disadvantages of conventional storage systems. To ensure consistency on a data storage system during both reads and writes on the client (e.g., computing devices communicating with the data storage system) and server side, data stored by conventional storage systems is often inaccessible to the client during system backups, hardware updates, and hardware failures. Even if the data is accessible during these times, e.g., a hardware failure, the data is often locked and cannot be written to by a client. Commit latency is also a problem occurring in common storage systems, because each write is first prepared and then committed to the system to ensure a successful commit and data consistency across servers and client devices.

In response to recognizing these deficiencies of conventional storage systems, the inventors have conceived and reduced to practice a transactional block data system in which data is made available in at least two logical locations. This system may be implemented, for example, in a file system, a block storage device over a block protocol (e.g., iSCSI), a database, or an object store, and so on. Methods allowing for continuous write access to the data at a logical location during system failures can then be implemented. With this backup copy of data created, various additional methods are implemented to improve system performance and efficiency. For example, one method includes replicating a backup copy to create a second, additional backup copy when a storage device becomes unavailable. This additional backup copy is then utilized to provide continual access to the data when that storage device is unavailable. In another method, creation of an additional data copy is used to move data across various storage devices in the data storage system. In yet another method, the data copy is merged with other data in the data storage system to consolidate the data on a hardware storage device. Each of these methods is further discussed below with reference to a file system. However, in various embodiments the transactional block data storage system is implemented in systems of a variety of other types.

Figure 1:
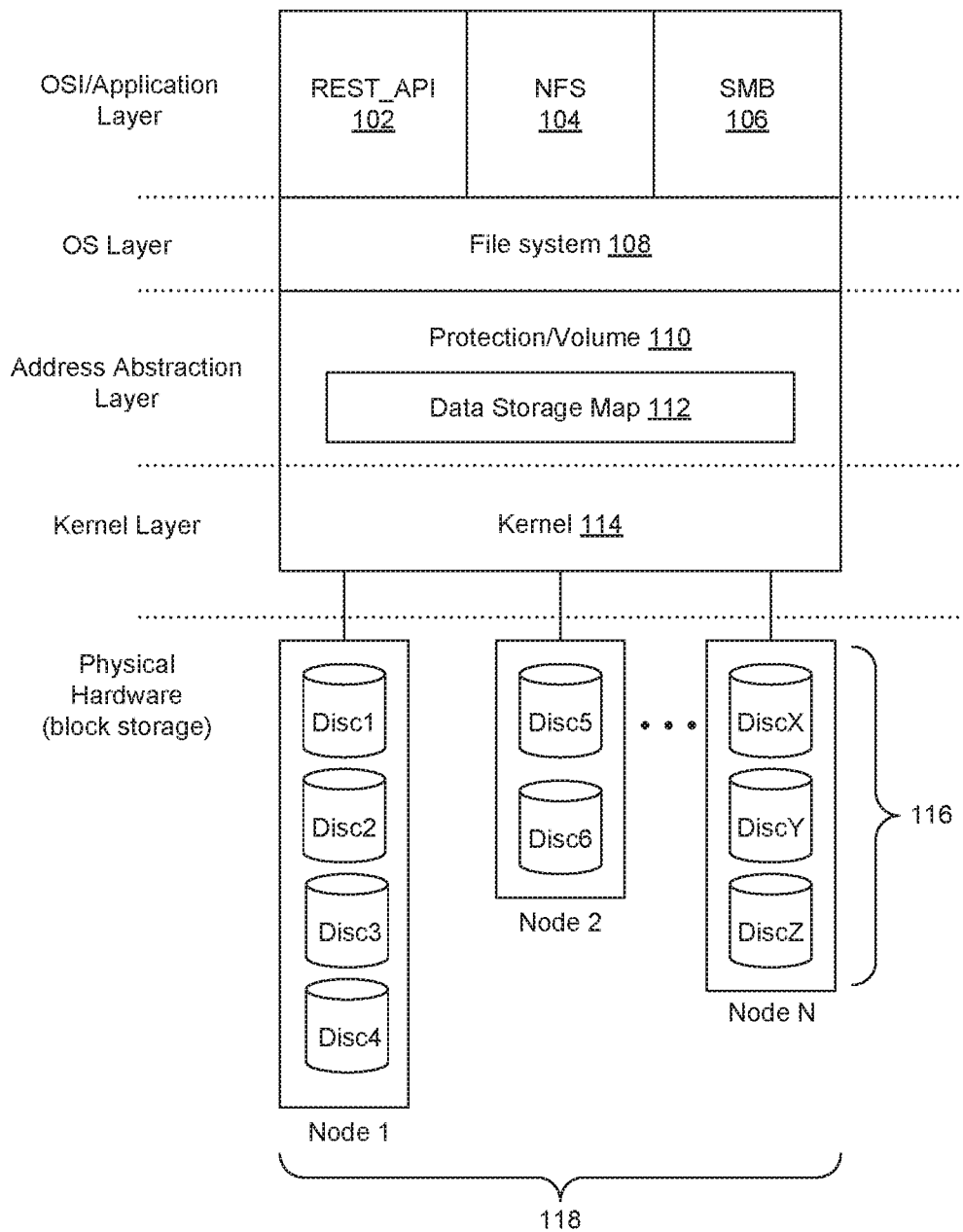
FIG. 1 is an abstraction level diagram of the facility including clusters of hardware storage devices operated by the facility.

FIG. 1 is a top-level block diagram of a networked data storage system that includes various layers. For example, to provide client access to the data stored in the data storage system, the (OSI)/Application layer exposes an instance of a web application programming interface (API) 102 (e.g., REST), a network file system protocol 104 (NFS), and an application layer network protocol 106 (e.g., SMB). The NFS protocol 104 is an application level protocol used to access the facility over a network, such as the Internet. The application layer network protocol 106 may be used to communicate with other nodes in the facility, accessible by the NFS 104, a host (local) file system 108, and so on. An operating system layer implements a core file system 108. To access stored data, the core file system 108 references a location (e.g., in a protected storage unit) which is used by an address abstraction layer to retrieve the requested data. Accordingly, the address abstraction layer includes a protection/volume 110 (e.g., a protected storage unit) referenced by the local file system 108 and a kernel layer that translates requests from the OS layer and an address provided by the address layer. The address abstraction layer may also include a copy of a data storage map 112 that links protected data storage units (pstores) referenced by the file system 108 to one or more layers in those pstores.

The layers within the pstores further reference two or more bstore IDs, each of which identifies a block storage unit (bstore) located on a particular computer node 118 and a particular hardware storage device 116 associated with that particular computer node 118. The two or more referenced bstores in each layer provide the physical locations of the mirrored data. Accordingly, a single layer in a pstore references physical locations in the data storage system containing the same data. That single layer is a logical location in the data storage system that is accessible via a logical address. The data storage map 112, also referred to as the pstore to bstore map (pb-map), may be stored on a paxos or similar system capable of facilitating atomic transactions across every computer node in the data storage system. The paxos system may also be used to facilitate maintaining synchronized copies of the data storage map 112 on each computer node 118.

At the lowest layer in FIG. 1, the physical hardware layer, the data storage system includes a plurality of networked computer nodes 118, or clusters, (e.g., Node 1, Node 2, Node N). Each node within the cluster 300 has a particular address, or path name accessible via the network file system protocol, an instance of which is included on each node. Accordingly, each networked computer node 118 further includes one or more computer processors and one or more associated data storages devices 116 (e.g., Disc1, Disc2, Disc3, etc.), such as hard discs, solid state disc drives, and other hardware storage devices providing a computer readable medium on which data is stored.

Figure 2:
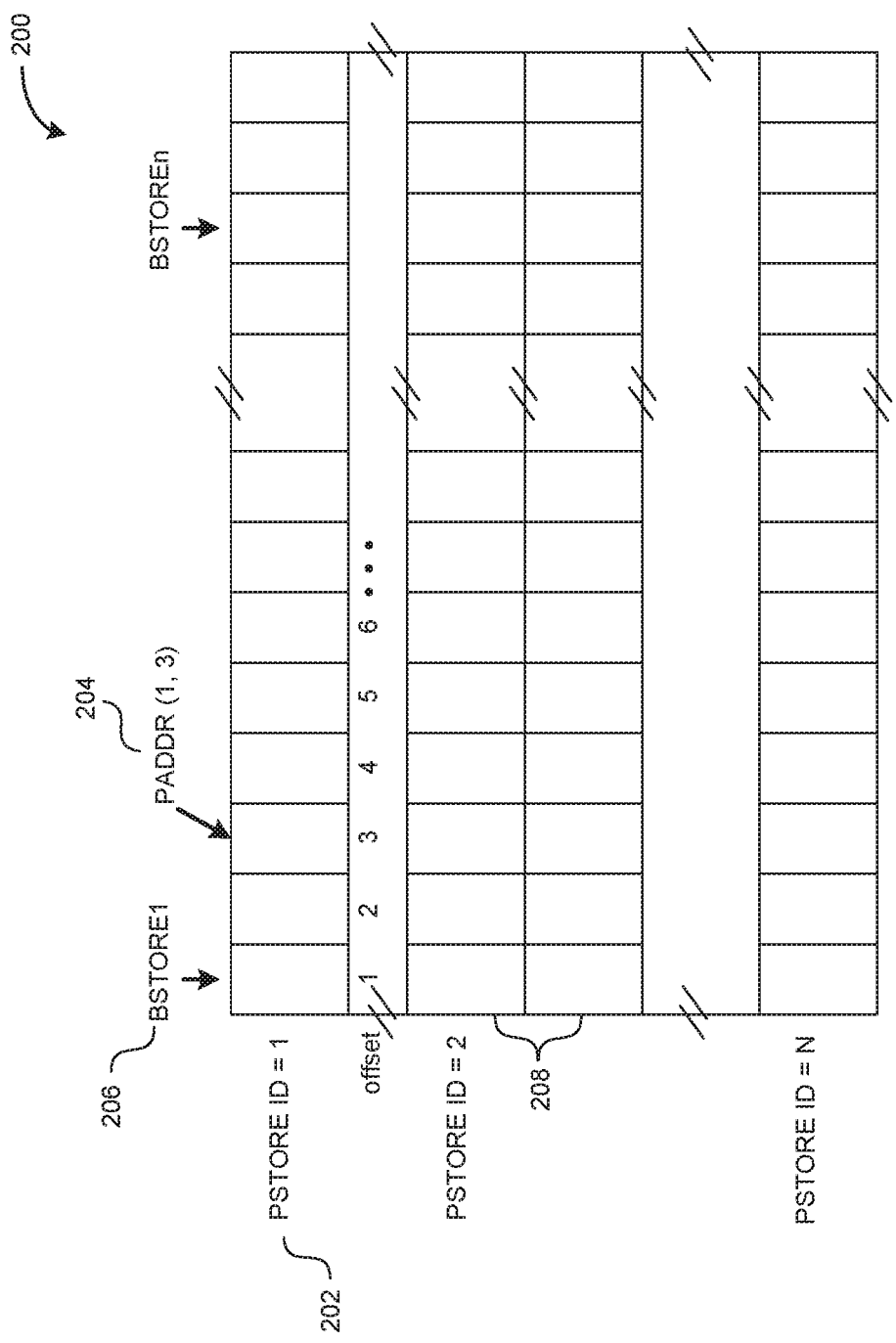
FIG. 2 shows a representative structure of protected data storage units (pstores).

FIG. 2 shows a top-level symbolic representation of a protected data space is shown. The protected data space includes a plurality of protected data storage units (pstores) of either fixed or variable sizes comprised of a number of protected address block storage units (bstores) of a specified size. Each pstore is assigned a unique pstore ID (e.g., 202) that may be used to reference that particular pstore in the data storage system. Each pstore may be accessed from the file system (e.g., file system 108 in FIG. 1) by a protected data storage address (paddr). In some embodiments, the paddr is a tuple including (1) a reference to given pstore ID, and (2) an offset within the identified pstore. The offset identifies an offset in a unique bstore within the referenced pstore. The pb-map is used to identify the unique bstore (and its mirrored bstore) in that referenced pstore. For example, PADDR (1, 3) 204 identifies an offset of "3" in a unique bstore in pstore "1". In the aforementioned embodiment, if the bstores (i.e., the unique bstore and its copy) in a first (top) layer did not contain the data at the offset identified in the write request, the bstores located in the second layer can then be read at that offset, then the third layer and so on.

Figure 3:
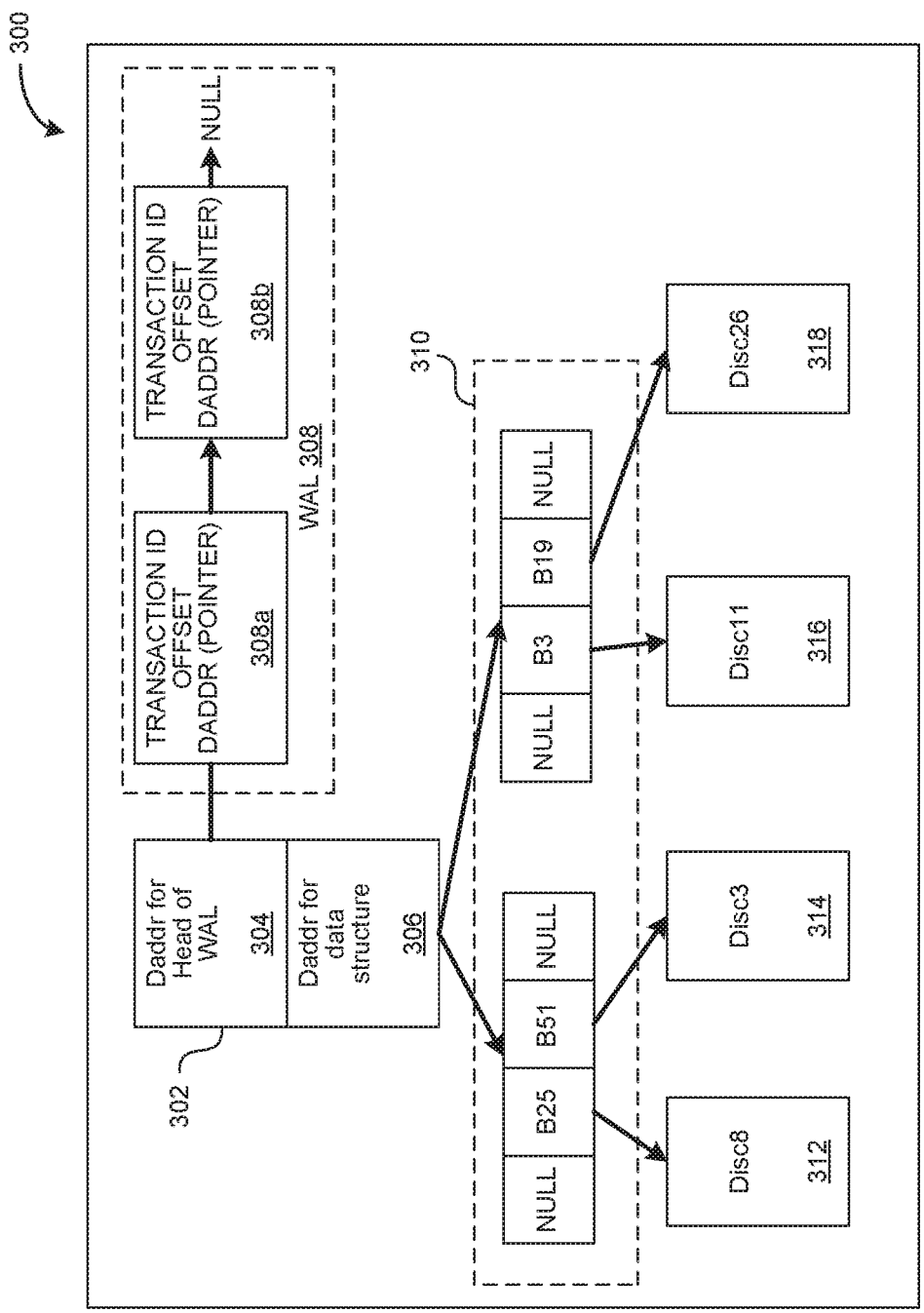
FIG. 3 shows a representative structure of a block storage unit (bstore).

FIG. 3 illustrates example of a block storage unit (bstore) superblock 300 for a bstore. The bstore superblock contains all of information needed to access data in a given bstore referenced in a protected storage unit. For example, in some embodiments, the bstore superblock 300 includes a pointer to write ahead log 302 and a pointer to a data structure 306. The pointer to the write ahead log (WAL) 302 maps offsets to disc addresses (daddrs) for log entries (308a, 308b) that comprise the write ahead log (WAL) 308. The WAL is a collection of data writes that have been committed by the system for the bstore, but not yet globally checkpointed, i.e., flushed to disc. So, the WAL for each bstore is a temporary storage of newly received data writes. Each log entry includes data written to that bstore during a particular transaction. As will be discussed in later paragraphs with reference to FIG. 7, a transaction can include numerous writes committed to the system in a single phase. Referring again to FIG. 3, the pointer to the data structure maps offsets to disc addresses (daddrs) for a plurality of data blocks (312, 314, 316, 318) of data that have successfully been committed to the data storage system.

As discussed with reference to FIG. 1, the address abstraction layer facilitates the management of protected data by isolating the complexities of multiple instantiations of data from the file system. The file system may reference a single protected data address (paddr), which comprises a pstore ID and an offset. The paddr can be used by both the address abstraction layer and the pb-map to logically locate two or more copies of the data referenced in that paddr.

Figure 4:
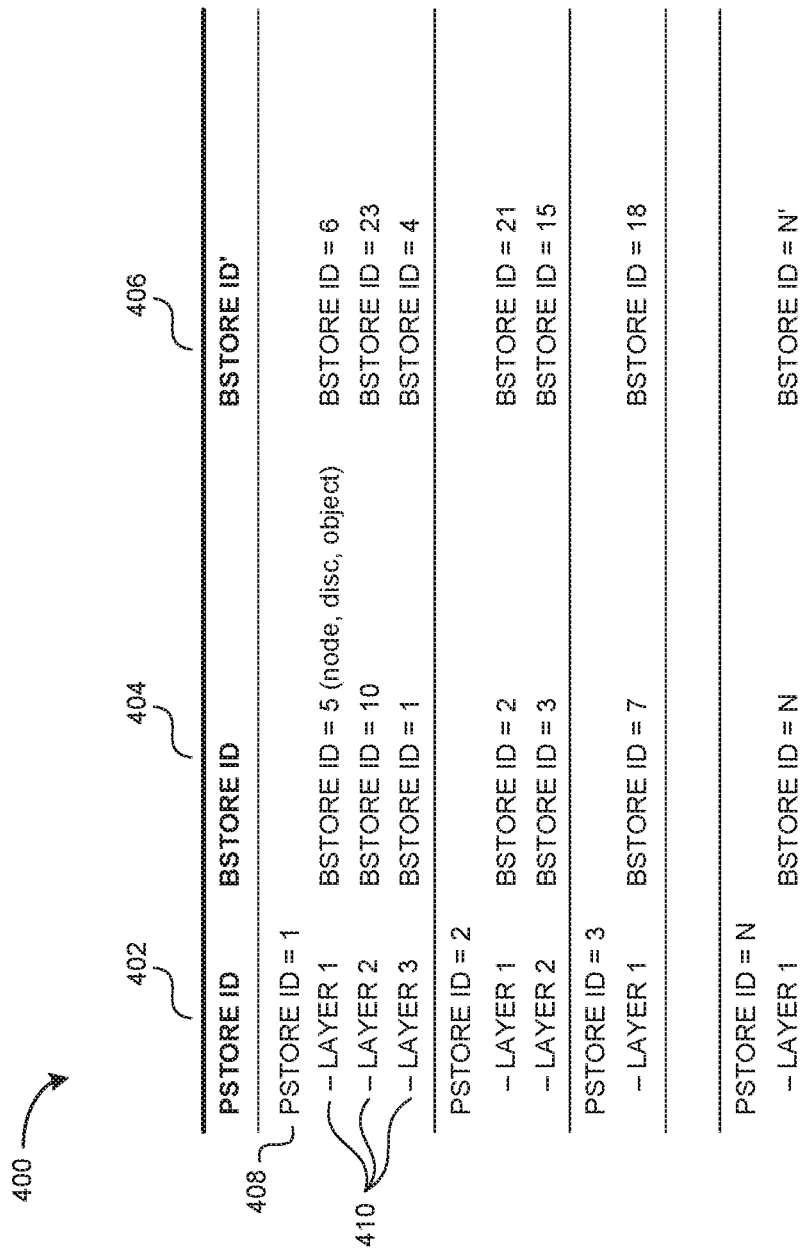
FIG. 4 shows a sample protected data storage unit (pstore) to block storage unit (bstore) data storage map for addressing data stored in the facility.

FIG. 4 shows a high-level embodiment of a data storage map, or pb-map 400, which tracks, for the one or more layers making up each pstore, the bstore IDs of the bstores constituting that layer. Each layer references two or more bstore IDs, which provide a node and disc on which the bstore is physically stored as well as a disc object at which is located a superblock for that bstore. In the exemplary pb-map, 400 a plurality of pstore IDs are shown, each pstore identified by a numerical pstore ID (e.g., PSTORE ID=1, PSTORE ID=2).

Because FIG. 4 relates to a file system in which data is mirrored to ensure its integrity, it shows two mirrored bstore IDs in each layer, one bstore identified under BSTORE ID 404 and the second identified under BSTORE ID 406. As previously mentioned, the protection method implemented for a given layer may include a protection scheme such as mirroring, a parity stripe, a Reed Solomon encoded stripe, or similar protection scheme. In some embodiments, the protection scheme varies between layers. In other embodiments, the extent of the data protection provided varies depending on the desired level of redundancy. For example, two or more mirrored copies may be referenced in a single layer or one or more parity stripes may be provided, depending upon the level of data protection desired and the desired fault tolerance. For example, in PSTORE ID1 408, there are three layers 410, each layer referencing two or more bstores IDs that identifying bstores in which copies of the same data is stored in the data storage system. In layer 1, BSTORE ID=5 and BSTORE ID=6 both contain the same data. In layer 2, BSTORE ID=10 and BSTORE ID=23 both contain the same data. In most embodiments, a pstore may have any number of layers and any number of bstore copies (BSTORE, BSTORE ID, BSTORE ID', BSTORE ID", etc.)

As previously mentioned, for each pstore ID entry in the pb-map there may be one or more layers. The top layer, i.e., layer 1, is the only writeable layer in any given pstore. Accordingly, to write to a specific pstore with a pstore address (paddr=pstore ID, offset), the identified pstore ID identified in the paddr is first looked up in the pb-map. Once found, the pstore is used to identify the associated bstore IDs in the top layer are then identified. The system would then write the data intended for paddr to the bstores referenced by the identified bstore IDs at the offset specified in the paddr. For example, in some embodiments, to write to a paddr (pstore ID=1, offset=56), pstore ID=1 is looked up in the pb-map. The bstore IDs in the top layer are then identified. Referring back to FIG. 4, for example, this includes bstore ID=5 and bstore ID=6. After identifying these bstores, the data is then written to both bstore ID=5 and bstore ID=6 at an offset of 56.

To perform a read of the data at a particular paddr (pstore ID, offset), the pstore ID identified in the paddr is first looked up in the pb-map stored in the address abstraction layer of the data storage system. The associated bstore IDs in the top layer of the identified pstore are then identified and an attempt is made to read the data from one of those bstores referenced by the corresponding bstore IDs at the offset specified in the paddr. If that data block is found in the bstore, the data is returned in response to the read request. If the identified bstore ID is unavailable, or there is another error, a read attempt is made on a bstore referenced by another bstore ID referenced in the same layer. A read may be attempted sequentially for all bstore IDs identified in the layer until an available bstore is found.

In some embodiments, an available bstore returns the block of data or a message to the effect of "I don't have it." If the available bstore does not have the data, the next layer in the same pstore is referenced and a new set of bstore IDs identified. Again, a read may be attempted sequentially for all referenced bstores in this next layer until an available bstore is found. In an illustrative and non-limiting example, a read for the paddr (pstore ID=1, offset=56) is looked up in the pb-map. The bstore IDs in the top layer are then identified. As shown in FIG. 4, these are bstore ID=5 and bstore ID=6. An attempt is then made to read the bstore identified by the bstore ID=5 (bstore5) at offset 56. If bstore5 is not available, an attempt is made to read the bstore identified by bstore ID=6 (bstore6) at offset 56. If bstore6 returns a message to the effect of "I don't have it", layer 2 in pstore ID=1 is accessed and bstore ID=10 and bstore ID=23 are identified. A read request is then sent to the bstore associated with bstore ID=10 (bstore10) at offset 56. If bstore10 returns a block of data, this data is passed back to the client initiating the read request.

In some embodiments, each bstore ID has a corresponding physical hardware address associated with a computer node, a data storage device on a computer node, and a disc object at which is located a super block for that bstore. This information may be embedded as a tuple in the pb-map, and looked up in an external data structure. The super block may comprise a link to a write ahead log and a link to a data structure comprising disc address pointers or offsets corresponding to associated protected data blocks. The data structure may comprise an index table, a hash map, a b-tree or any common method of mapping between two integers. The offset in the paddr is used to access the data structure and identify the disc address pointer at which is located the protected data block. The link to the write ahead log may point to a linked list of log entries comprising the write ahead log, WAL. In some embodiments, the WAL may be implemented as a linked list, a linear log, or any other representation of a log. The log entries may comprise a transaction ID and one or more offsets together with their associated disc address pointer which points to the data block which has been written out of place on the same hardware storage device on which the bstore is located.

In some embodiments, when a write request is sent in a commit request to a particular bstore ID, space on the indicated computer node and data storage device (i.e., disc) is allocated and the data is written to the data storage device (e.g., disc1, disc2, disc3 in FIG. 1). An entry is then added to the write ahead log (WAL) for that bstore including the offset from the paddr and the disc address pointer corresponding to the allocated disc space where the data was written. Any log entry in the WAL can include more than one pair of offset and disc address pointer.

FIG. 5 is a high level schematic that illustrates a historical two phase commit. This two stage commit 500 consists of a prepare phase, PHASE I 510, and a commit phase, PHASE II 512. Data writes have historically included this two-phase approach beginning with sending a "prepare" message to all nodes to which the data is to be written. During this first stage, all data on nodes receiving data writes is locked. Accordingly, no new writes can be received until the data is committed during the next stage.

Upon receipt of a positive acknowledgement from all the nodes, a "commit" message is sent to all the nodes including the data to be written to each data block. Subsequently, upon receipt of positive commit acknowledgement from all nodes, the data is considered durably written to disc. While this approach ensures that the data is written successfully to disc prior to sending confirmation to the file system, the two phase nature of the approach requires two round trip communication loops across a data storage system, such as a cluster network, before the data write is confirmed. This can create delays in the system and reduce perceived performance of the data storage system relative to a single-phase commit, which is described in the following paragraphs with reference to FIGS. 6A-6B.

FIG. 6A is a high level schematic showing a single phase commit process where data is considered durably written after a single round trip communication loop across the data storage system. In some embodiments, the single phase commit process 600 is made up of a single phase 610 in which a write request to a particular bstore ID is sent with the corresponding data to be written as a commit request to all the bstore IDs associated with the top layer of an identified pstore. Those bstores may be located on various nodes (Node 1 604, Node 2 606) in the data storage system. The data received in the commit request is then written to the bstores in that top layer and an entry is made in the write ahead log (WAL) associated with each identified bstore. Once this entry has been added to the write ahead log (WAL), a confirmation is returned from each node to the client in the form of a commit response. In some embodiments, write requests are sent and then followed by commit requests using a Remote Procedure Call (RPC) system that guarantees ordering of the requests. In this manner, the data storage system can guarantee that the commit requests arrive after all of the write requests have been received, eliminating any need for receiving acknowledgments of the write requests from each individual bstore before sending the commit requests. Once a positive confirmation (i.e., commit response) is received from each of the bstores to which the write request is sent, notification of a successful write is returned to the client 602 that requested the protected data write. This one phase commit generally results in a reduction in latency between write initiation and the file system receiving confirmation that the data is written. In some embodiments, a successful write may be returned to the client after a failure if it is determined that the transaction was globally committed, with a "cleaning kit" being created (if needed). In embodiments described herein, a cleaning kit comprises the data needed to bring a bstore to a known state, which is typically less than a full backup copy of the bstore and can be used to restore a bstore which has become unavailable. A cleaning kit includes the outcomes of all in-flight transactions (i.e., those transactions relevant to the bstore that have not been committed) and data associated with a subset of those transactions (e.g., the transactions found in the WAL of the mirrored or copied bstore). A cleaning kit may be generated on a node other than the node on which the unavailable bstore is located, and is created when a node or disc fails during a data write to that particular disc. Accordingly, if the data writes are positively committed to a plurality of bstores, indicated by positive commit responses, but one or more bstores return a null or unknown commit response due to unavailability of a node, those one or more bstores require a cleaning kit to ensure no data was lost when the storage device failed during the transaction. In some embodiments, a notification of an unsuccessful write is returned to the client 602, indicating that one or more commit responses were negative. If even one bstore is known not to commit, the transaction is then rolled back and another write attempt will be made.

Figure 6B:
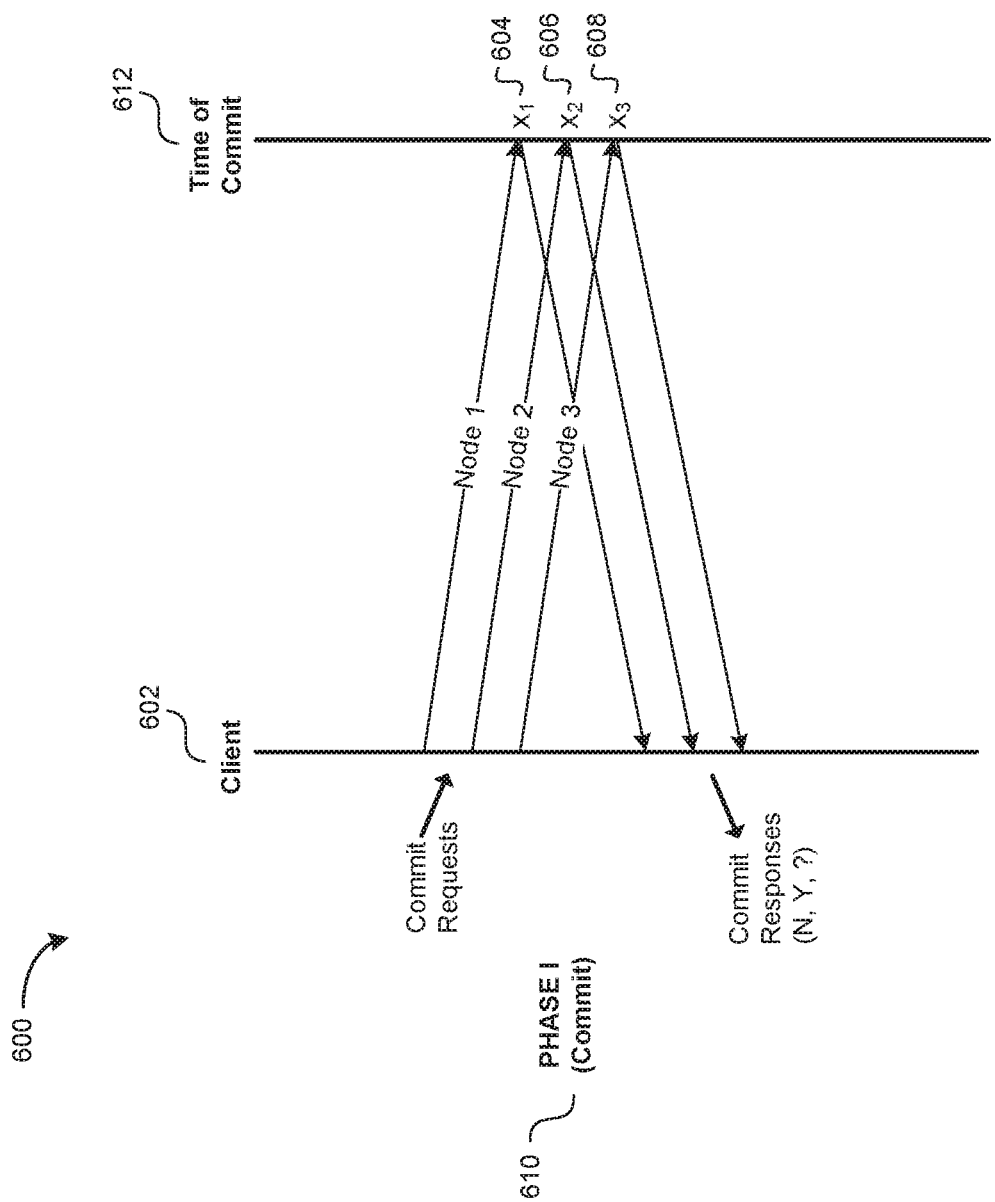
FIG. 6B shows a timing diagram representing the transaction made in a single-phase commit in FIG. 6A.

For example, in FIG. 6B, a write request is sent as commit requests to three bstores on Node 1, Node 2, Node 3, respectively, during a transaction. The first commit request may be written to the bstore WAL in Node 1 604 at a time $x_1$, the second to the bstore WAL in Node 2 606 and time $x_2$, and the third to the bstore WAL in Node 3 608 at time $x_3$. If Node 1 604 fails prior to the write to the bstore WAL, a commit response is received as "N", so the entire transaction can be cancelled and rolled back. If Node 1 604 writes to the bstore WAL and returns a positive commit response "Y", but Node 2 606 fails prior to the write the associated bstore WAL (i.e., commit response is "N"), then the transaction is cancelled and rolled back, and the data is removed from the bstore WAL in Node 1 604. However, if both Node 1 604 and Node 2 606 return positive commit responses "Y" and "Y" and Node 3 608 fails during the write to the bstore WAL (i.e., commit response is "?"), the transaction can be determined to be positive. Accordingly, it is determined that Node 3 608 containing the third bstore went down before a confirmation was received in a commit response. In the latter case, a cleaning kit is created to ensure no data is lost during the node failure and to restore the bstore on the downed node once it becomes available again. Once the cleaning kit is created and populated for the third bstore, a successful write can be returned to the client.

As discussed in the previous embodiments, it may be possible for a component of the data storage cluster such as a computer node or hardware storage device to fail or become unavailable partway through a write. In embodiments, if the response state of a bstore to a write request is unknown due to an unavailability of a computer node or hardware storage device associated with that bstore, the response may be assumed to have been positive. It may be assumed to have been positive because, if a positive response was sent prior to the failure and a positive response was received from the other bstores, the file system may assume that the data has been durably written. This ensures that the data storage is consistent with the file system view.

In some embodiments, upon recovery from a system error or upon system start-up, one node may be the "recovery leader." This node may ask every bstore in the system to provide a list of log entry in its write ahead log (WAL). This information may be used to build a transaction status table.

Figure 7:
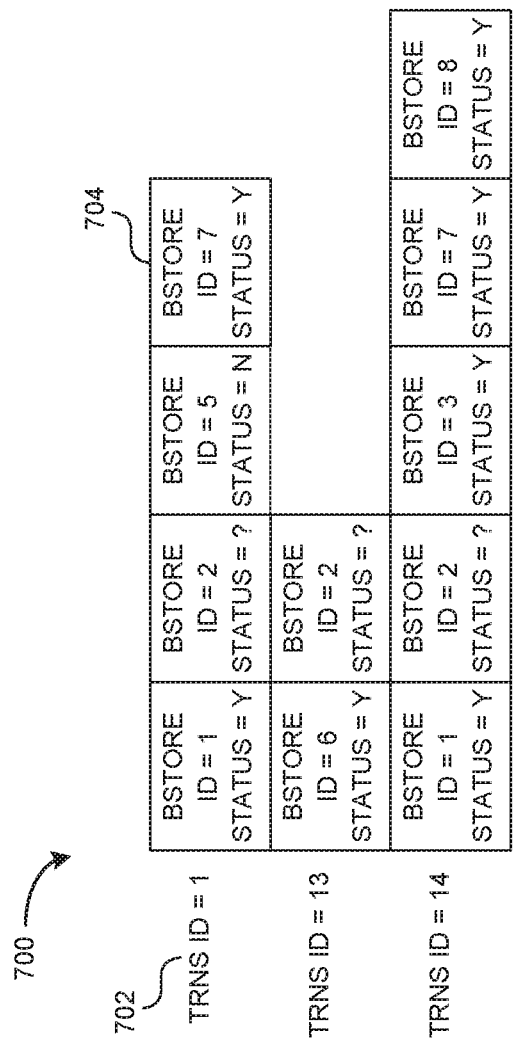
FIG. 7 shows a transaction log indicating write responses to specified bstores during a single-phase commit.

FIG. 7 shows sample transaction table that includes various transactions, each identified by a transaction ID (e.g., transaction ID=1, transaction ID=13). Each transaction includes various write requests that are bundled together and submitted in a single-phase commit to the data storage system. Accordingly, numerous write requests may be received by one or more clients, and many of those write requests can be directed to one particular logical address, e.g., paddr, while other are directed to another logical address. Consequently the transaction status returned by each logical address (i.e., a bstore identified by the paddr) involved in the transaction is returned by each bstore involved in the transaction, identified under the transaction ID. For a given transaction ID, if the transaction status for each bstore is positive, the transaction is rolled forward and the client is notified that the data was successfully committed to the data storage system. If the transaction status of any bstores for a given transaction ID is negative, the transaction is rolled back and the entry for that transaction ID is removed from the write ahead log (WAL) for each of the bstores associated with the transaction ID. If the transaction status for any of the bstores for a given transaction ID is unknown, but the remainder of the bstores for that transaction ID returned a positive transaction status, the transaction is rolled forward to assure consistency between the data storage and the file system view.

For example, in FIG. 7 "TRNS ID=1" is determined to be negative. It is determined to be negative because transaction ID=1 shows a transaction status of unknown ("?") for bstore ID=2 and a negative transaction status ("N") for bstore ID=5. So, transaction ID=1 is rolled back and removed from the write ahead logs for bstore ID=1 and bstore ID=7, which both provided positive transaction statuses ("Y"). Accordingly, regardless of any bstore returning a positive transaction status, if any one bstore returns a negative transaction status, the transaction is rolled back.

For transaction ID=13, BSTORE ID=6 has a positive transaction status but an unknown transaction status for BSTORE ID=2. Because the transaction status is unknown for BSTORE ID=2, but the remainder of the transaction status responses are positive, it is possible that BSTORE ID=2 returned a positive, which would have resulted in an affirmation of a durable write being returned to the client. Therefore, to keep the file system and data storage consistent, transaction ID=13 must be rolled forward. This may be done using a cleaning kit. As previously mentioned, a cleaning kit comprises the data needed to bring a bstore to a known state. In embodiments described herein, a cleaning kit is generated on a node other than the node on which the corresponding bstore is located. In some embodiments, the cleaning kit is generated on the same node on which the unavailable bstore is located, but on a different hardware storage device (i.e., disc) within that node. Furthermore, although the previous example illustrates a transaction limited to a single pstore, it should be understood that a single transaction can, and often does, affect multiple pstores. In some embodiments, the write requests received from clients for each pstore are bundled together in a single commit request, and numerous of those commit requests may be included in a single transaction. A single transaction includes a plurality of commit requests intended for any number of pstores and, consequently, any number of bstores.

In some embodiments, upon system restart, the file system may search the pb-map to identify bstore IDs referencing a failed or unavailable computer node or hardware storage device. When such a bstore ID is identified, a cleaning kit is created from one or more of the remaining bstores, in the same layer associated the particular pstore ID. The cleaning kit may include information regarding the in-process transactions to be rolled forward such as transaction ID, offset, and data to be written. There may be rules regarding the location of the cleaning kit such as not on the same node as the remaining bstore used to create the cleaning kit, not on the same node as the unavailable bstore and the like. The cleaning kit is referenced by a cleaning kit ID in the pb-map. The cleaning kit ID includes a node, a disc (i.e., a, hardware storage device), and an object. The cleaning kit is then stored in the pb-map in the same layer of the pstore in which the information regarding the unavailable bstore. The cleaning kit is then used to update the unavailable bstore with the data received in any new write request when that bstore becomes available.

Upon application of the cleaning kit, the protection is again consistent. For example, in a parity bstore, after cleaning kit is applied, the parity stripe is again consistent. In a mirrored protection scheme, once the cleaning kit applied, the updated bstore may be in a state where it mirrors the other bstores in the same layer and the protection is consistent.

FIGS. 8-13F illustrate the operation of various embodiments of a data protection scheme based on two mirrored bstore IDs referenced in each layer of a pstore. However, it should be understood that any of the aforementioned protection schemes and levels of protection may be implemented instead or in addition to the mirrored scheme. There may be rules associated with the construction of the pb-map such as: a given layer may not have multiple bstore IDs referencing the same computer node; a given layer may not have multiple bstore IDs referencing the same device or devices in the same physical location.

In FIGS. 8-13F various examples of a pb-map are shown illustrating the evolution of the logical location in a pb-map and the corresponding physical location in bstores on the different nodes as the system recovers from the failure of a single bstore, moves bstores between nodes, and merges bstores to consolidate space on disc.

Figure 8:
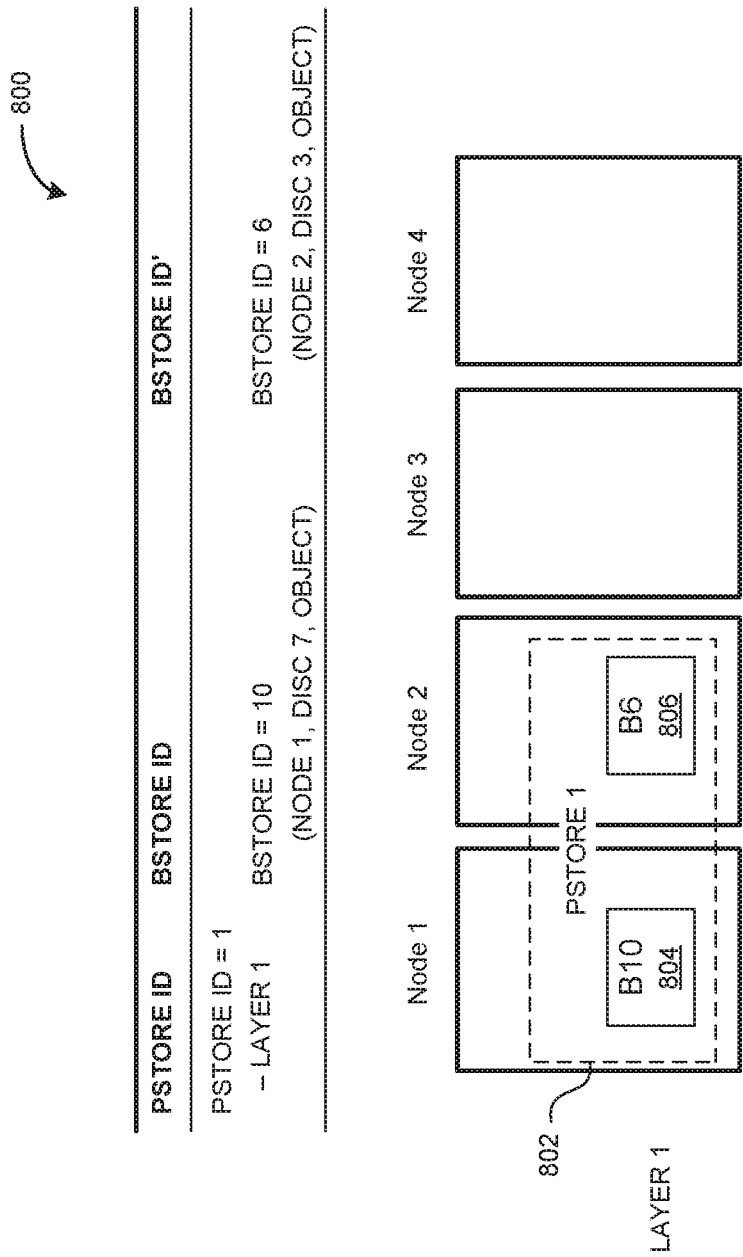
FIG. 8 shows a pstore to bstore map (pb-map) for a pstore with an underlying block diagram of the corresponding pstore as stored in the facility.

Referring now to FIG. 8, a high level schematic of various nodes and bstores contained in pstore1 (PSTORE ID=1) that are stored on those nodes. Also in FIG. 8, the corresponding pb-map is shown comprising a single layer associated with PSTORE ID=1. The bstores referenced in the pb-map are shown on the associated nodes in the schematic. For example, bstore B10 804 is on Node 1 and bstore B6 806 is on Node 2. The schematic and pb-map illustrated in FIG. 8 provide the basis for each of the exemplary embodiments discussed in FIGS. 9A-9C, 10, 11A-11D, 12A-12D, and 13A-13F.

Figure 9A:
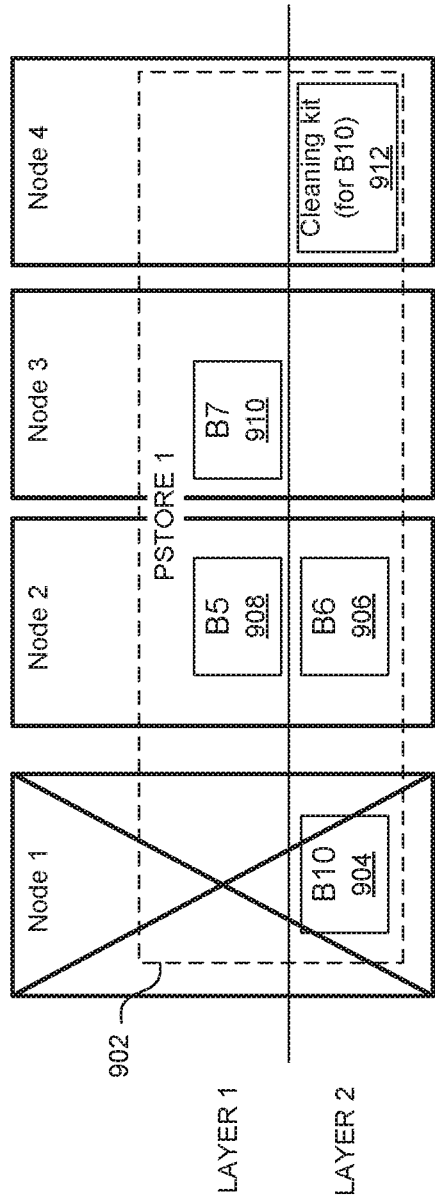
FIG. 9A-9C show a pstore to bstore map (pb-map) for a pstore and an underlying block diagram of the corresponding pstore as stored in the facility when an associated node becomes unavailable and a cleaning kit is created.
Figure 9B:
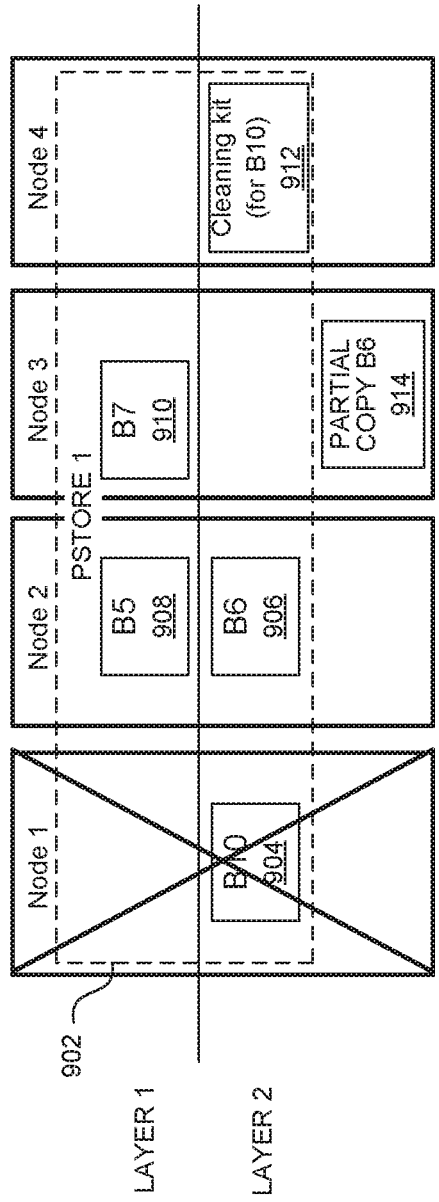
Figure 9C:
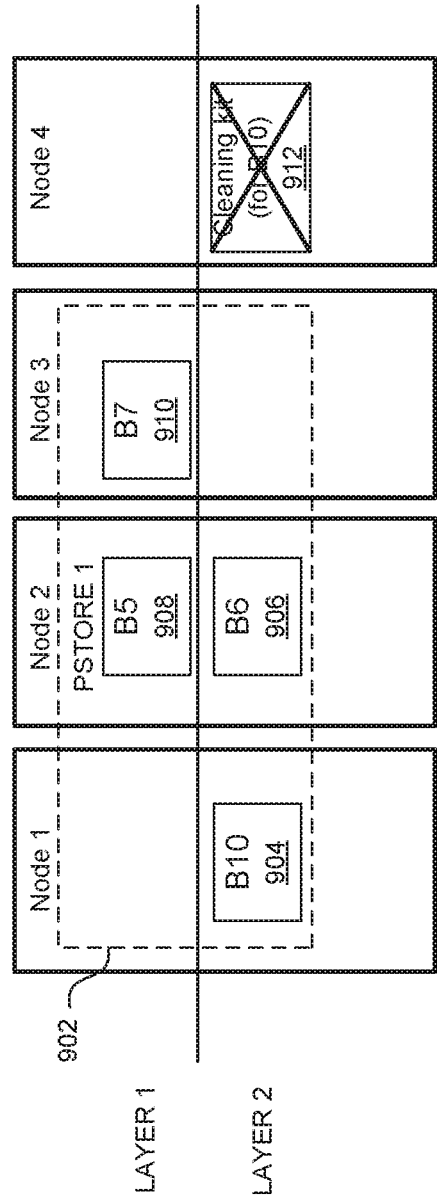

FIGS. 9A-9C show an example of generating a cleaning kit when a node containing a bstore becomes unavailable during a single phase commit. For example, in an embodiment shown in FIG. 7 where the transaction is positive, but a bstore returns a "?" as a commit response. FIGS. 9A-9C illustrate a pb-map and corresponding schematic of the generation of the cleaning kit in both the logical location and physical location within the data storage system.

FIG. 9A, illustrates a pb-map 900 that contains bstore10 in layer 2. As also illustrated in FIG. 9A, Node 1 on which bstore 10 904 is physically located in the corresponding schematic is shown as being unavailable during a transaction. As previously discussed, a transaction includes numerous commit requests atomically committed to the data storage system. Each commit request can include numerous write requests to a particular bstore. In FIG. 9A, a cleaning kit 912 has been created on Node 4 from the remaining bstore6 906 in layer 2, which contains the same data as the unavailable bstore, B10 906. A cleaning kit ID entry comprising a node, hardware storage device (i.e., disc), and disc object information is also added to the pb-map 900 in the same layer as the unavailable bstore, B10 904. In some embodiments, the cleaning kit is stored on a node and disc differing from the node and/or disc as the bstore from which it is created. For example, the cleaning kit 912 in FIG. 9A is created on Node 4, Disc 3, which differs from Node 2, Disc 3 on which bstore6 is stored.

In some embodiments, once the cleaning kit 912 is created, a new layer 1 is automatically added to pstore1 902 since only the top layer of the pstore can be written to during a transaction. This ensures that any new data can be received by the pstore during the process of data restoration through the cleaning kit. In other embodiments, once the cleaning kit 912 is created, a new top layer, e.g., layer 1, is added on demand, when a new write request is received for that particular pstore. The new layer 1 can includes at least two new bstores, B5 905 and B7 910 and corresponding bstore IDs in the pb-map 900. In some embodiments, at least one of the bstores, e.g., B5 or B7, is on the same node and hardware storage devices as one of the remaining bstores in the next underlying layer. For example, bstore B5 908 in layer 1 and bstore B6 in layer 2 are both stored on Node 2, Disc 3. All new writes to pstore1 902 are then written to the new bstores in the new layer 1. The information in the previous layer 1 is then logically stored in layer 2, as shown in FIG. 9A.

As illustrated in FIG. 9B, in some embodiments, once the new layer 1 is created for pstore1 902, a copy of the remaining available bstore B6 906, in layer 2 is also created on the same node and hardware storage device as one of the new bstores in layer 1. For example, a copy of B6 914 is added to Node 3, Disc 2, on which bstore B7 910 is also stored. This copy 914 is denoted as a "partial" copy because the full copy of the data contained in bstore B6 906 is not completely copied yet as the copying is occurring in a background process. The copy 914 is created as an additional backup copy in case B10 never becomes available again, such as discussed in following paragraphs with reference to FIG. 10. This copy 914 is not added to the pb-map but a reference to copy 914 is kept in memory (e.g., in memory of the Node on which the copy 914 is stored). The copy 914 is added to the pb-map after the copying process is complete and the original version can be deleted, reclaiming the space used to store it.

In some embodiments, the unavailable bstore B10 904 becomes available once again before the copy 914 of the remaining bstore B6 is complete. As shown in FIG. 9C, if the bstore B10, 904 becomes available, the cleaning kit 912 for that bstore, B10 904 in the pb-map is applied by adding the data stored in the cleaning kit 912 to the restored bstore B10 904. Accordingly, after adding this data from the cleaning kit, bstore B10 904 is brought back to a state where it mirrors the bstore, B6 906, used to create the cleaning kit. The cleaning kit 912 can then be deleted from Node 4 since both bstore B6 906 and bstore B10 904 mirror each other in the data storage system. Accordingly, no data loss has occurred even though Node 1 was temporarily down.

Figure 10:
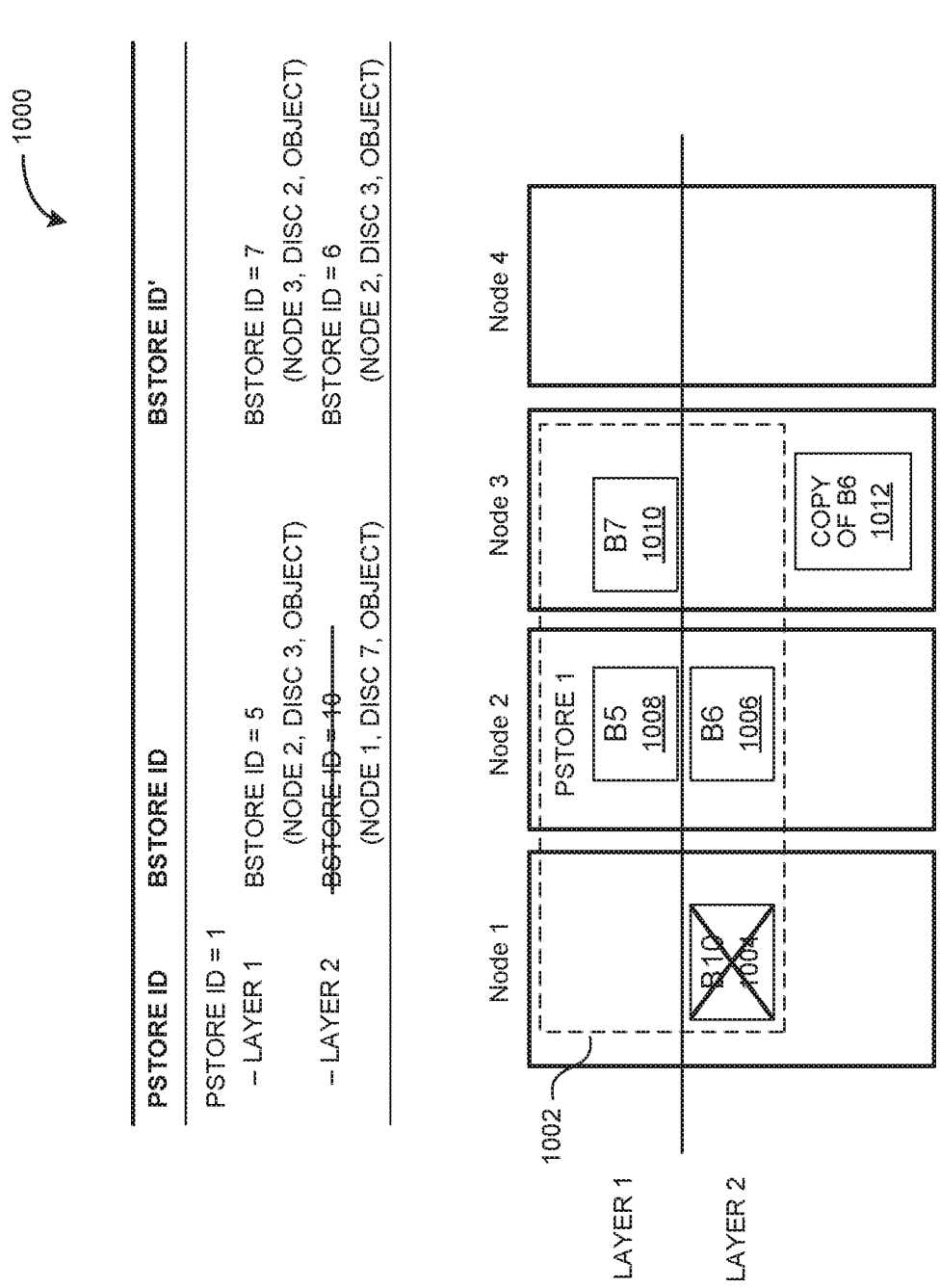
FIG. 10 shows a pstore to bstore map (pb-map) for a pstore with an underlying block diagram of the corresponding pstore as stored in the facility when an associated block storage unit becomes permanently unavailable and a backup copy is generated.

FIG. 10 shows an example in which an unavailable bstore B10 1004 does not become available prior to completion of a backup copy 1012 (FIG. 9B) being created. In such cases, a new bstore ID is allocated for a new bstore populated by the copy 1012 and that bstore ID is then added to the pb-map 1000 to replace the unavailable bstore B10 1004. As previously mentioned, a reference to copy 1012 remains in memory, shares a same node and disc of a bstore, B7 1010, in the new layer 1 of pstore1 1002 and then B10 is deleted from the layer 2 in its logical locations (pb-map) since its physical location is no longer available. This copy 1012 can then be assigned a bstore ID and can be added to layer 2 in place of bstore B10 1004. The cleaning kit generated for the unavailable bstore B10 10004 and its reference to that bstore are also deleted both the logical location in the pb-map and the physical location on disc.

FIGS. 11A-11D illustrate an example of consolidating bstores referencing one another onto a lesser number of nodes and then, subsequently, compacting the data on those nodes through a merge. For example, this can be done in order to consolidate data for a pstore that is received during a failover. In some embodiments, these consolidation processes are performed by the data storage system as a background process, copying and merging a plurality of bstores before updating the pb-map to reflect the changes.

Figure 11A:
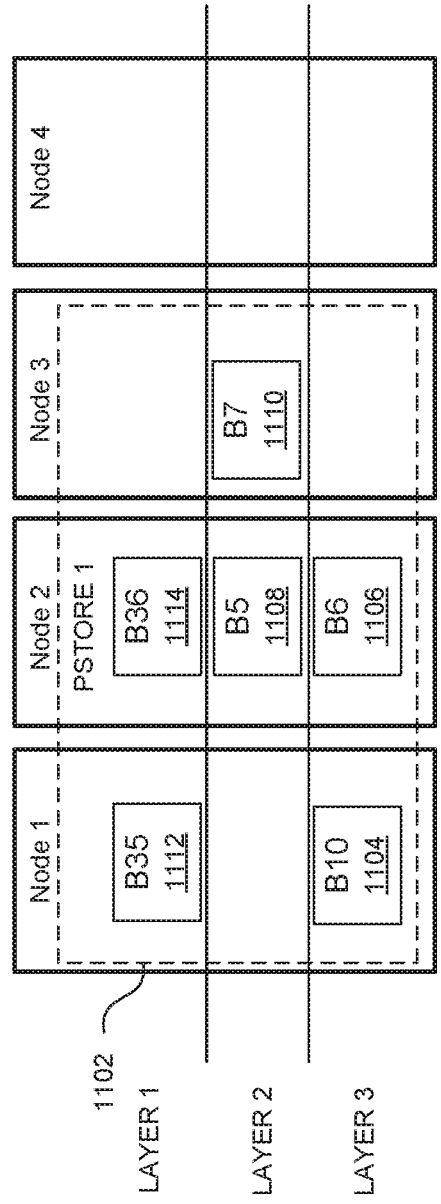
FIGS. 11A-11D show a pstore to bstore map (pb-map) for a pstore with an underlying block diagram of the corresponding pstore as stored in the facility when a block storage unit is moved and then block storage units on the same node are merged.

FIG. 11A shows a pb-map 1100 and corresponding schematic of a pstore1 1102 (PSTORE ID=1) including three layers of bstores. For example, pstore1 1102 can be the same pstore1 FIG. 9C after a bstore, B10 1104, is restored by use of a cleaning kit. In pstore1 1102, a new logical layer has been pushed into the pb-map for the pstore in order to receive new write requests from a client and to consolidate data intended for bstore B10 1104 when that node became unavailable. The new layer includes bstores B35 1112 and B36 1114, located on the same nodes and hardware storage devices as the original bstores B10 1104 and B6 1106 in pstore 1. The bstores in this new layer are created not only to receive new write requests, but also to merge data in lower layers. For example, data in bstore B10 1104 is also referenced by any new data received in bstore B7 while that node was down. Additionally, the new data received in bstore B35 112 also references the data in both bstore B7 1110 and bstore B10 1104. Bstores B6 1106, B5 1108, and B36 1114 each mirror the data in the aforementioned embodiments.

Figure 11B:
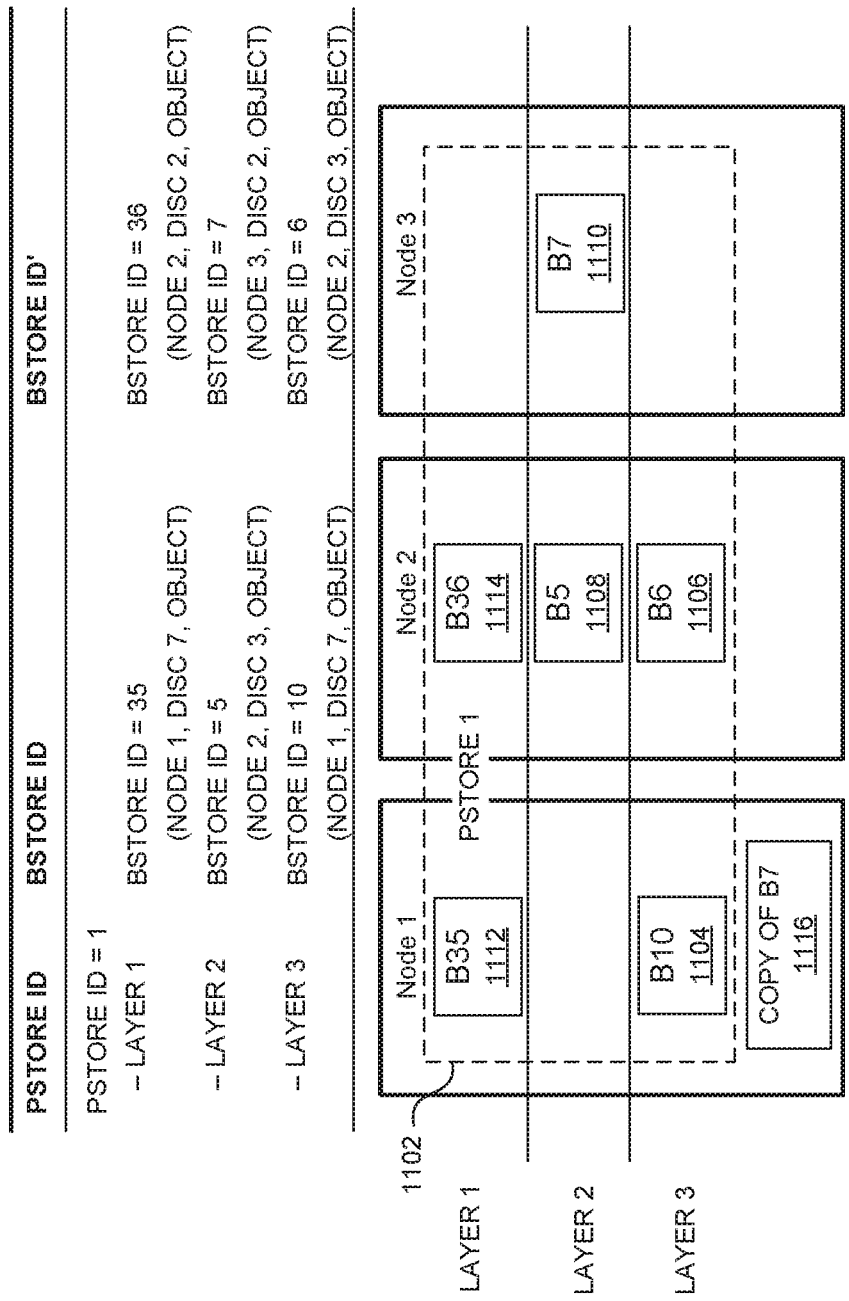

As shown in FIG. 11B, bstores B7 1110, which was added in a new layer to receive write requests when bstore, B10 1104 became unavailable (e.g., FIGS. 9A-9C), is located on a node (Node 3) separate from the other bstores in pstore1. Accordingly, to consolidate the data contained by the bstores containing data intended for B10 1104, bstore B7 1110 is first moved to Node 1. Accordingly, a copy of B7 is made on Node 1 and this copy does not appear in the pb-map, though a reference to the copy of B7 is maintained in-memory on Node 1.

Figure 11C:
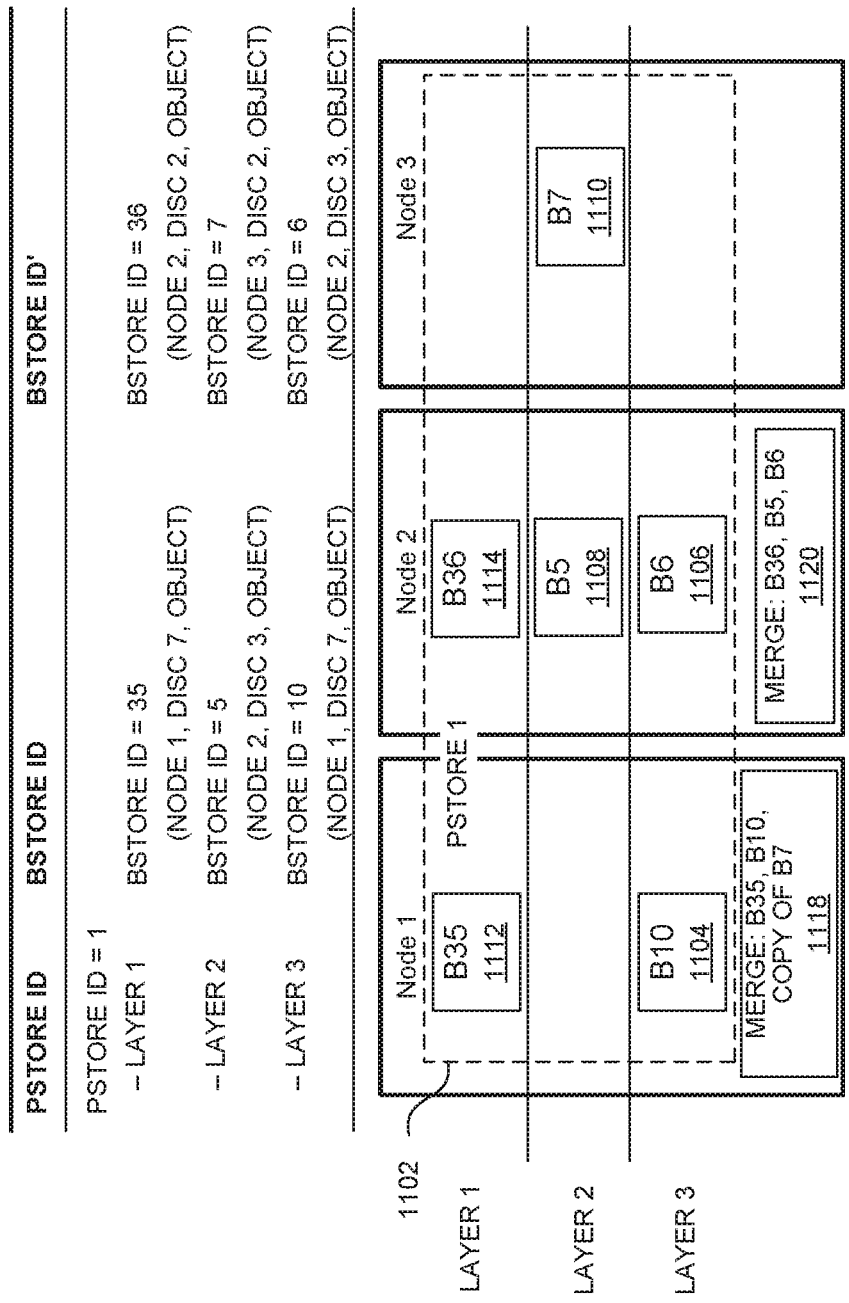

In FIG. 11C, the data within each layer of pstore1 is merged together on the corresponding node, Node 1 and Node 2. Again, the data in B5 mirrors copy of B7, the data in B6 mirrors B10, and the data in B36 mirrors B35. Accordingly, the merged data on Node 1 identically mirrors the merged data on Node 2.

Figure 11D:
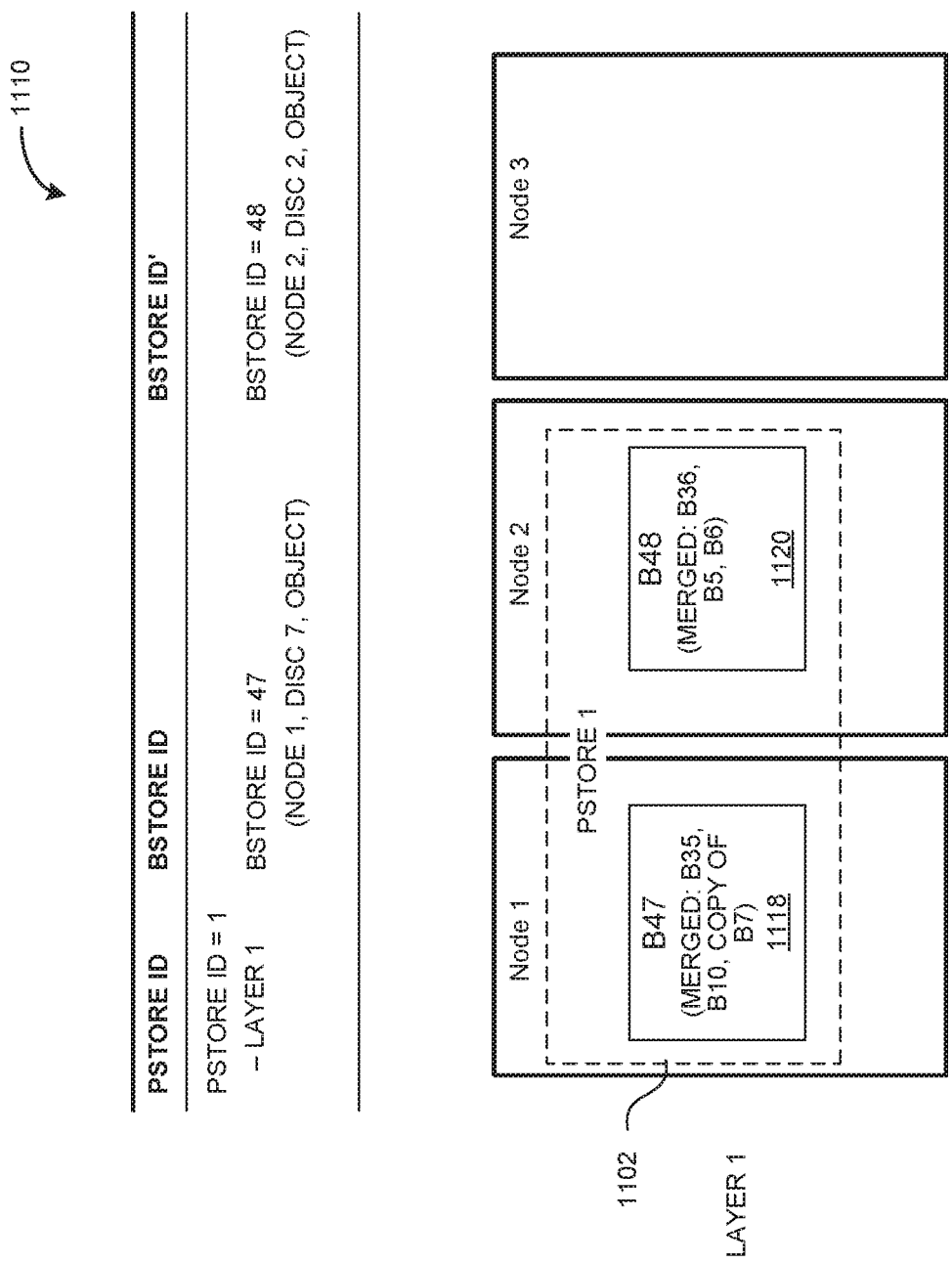

In FIG. 11D, since only a top layer can be written to, a new layer of bstores is added to pstore 1 1102 to receive the merged data on both Node 1 and Node 2. These new bstores B47 1118 and B48 1120 are then populated with merged data from other bstores related to the same pstore1 1102 on that same node and hardware device. Accordingly, new bstore B47 1118 on Node 1 includes merged data from B35, B10, and B7, while new bstore 48 1120 on Node 2 includes merged data from B36, B5, and B6. In some embodiments, new bstore B47 1118 and new bstore B48 1120 can be located, on the same node and hardware device as the previously unavailable bstore B10 1102 and its copy B6 1106.

Once the new bstores, B47 and B48, have been created and populated with the merged data, new corresponding logical addresses, or bstore IDs may be allocated to the new bstores and added to the pb-map in a single layer referencing those bstore IDs. The other bstores, e.g., B35, B10, B7, and lower layers are then removed from the pb-map 1110 as shown in FIG. 11D.

Figure 12A:
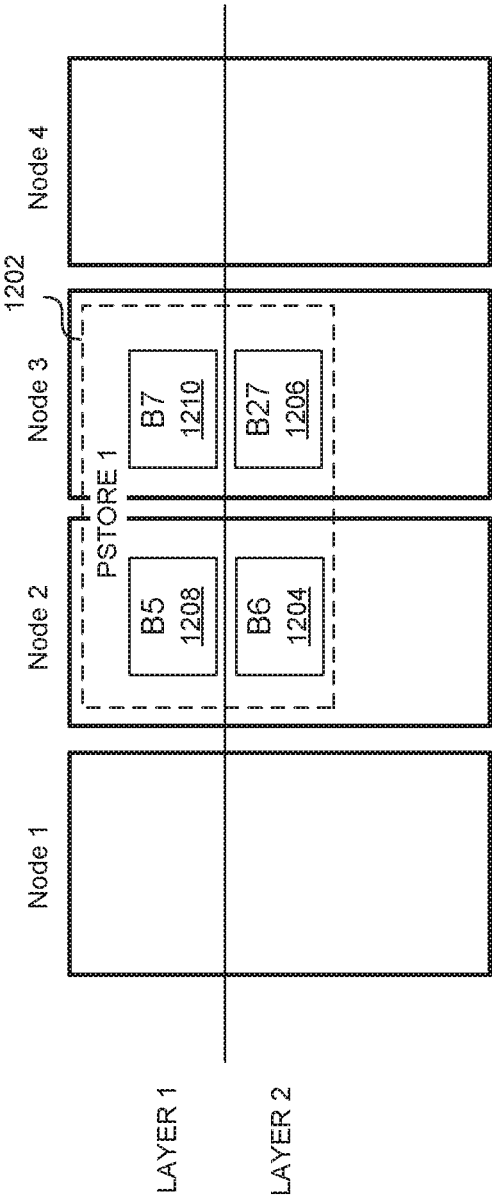
FIGS. 12A-12C show a pstore to bstore map (pb-map) for a pstore with an underlying block diagram of the corresponding pstore as stored in the facility when block storage units on the same node are merged.
Figure 12B:
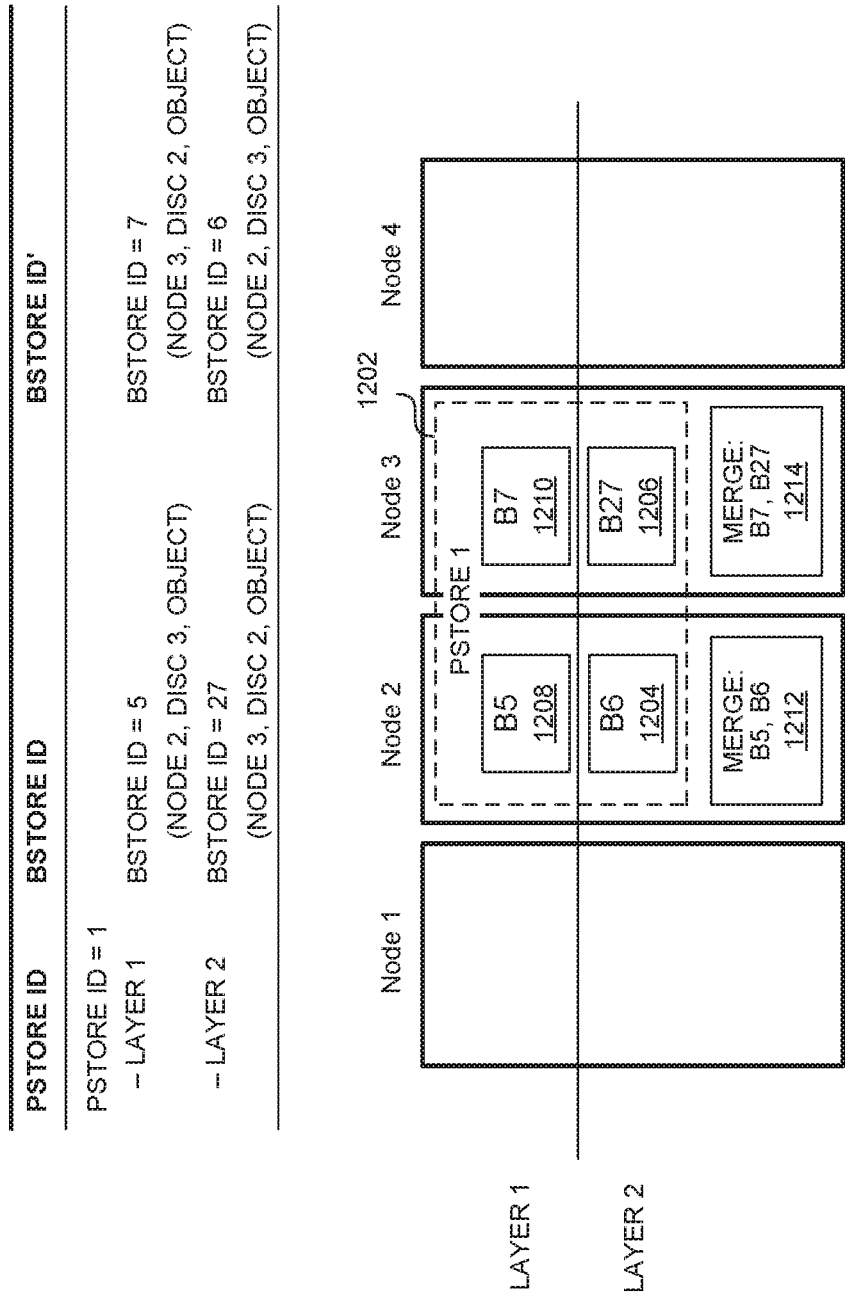
Figure 12C:
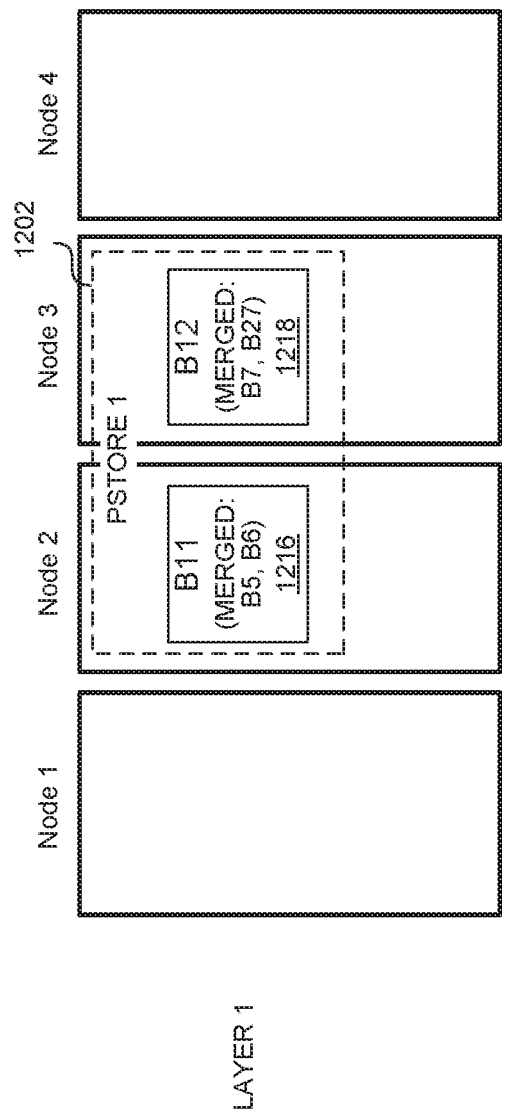

FIGS. 12A-12C show an example in which data stored on the same nodes, hardware devices, and pstore are merged in order to consolidate data on those nodes.

As shown in FIG. 12A, a given pstore ID, pstore1 1202, has two or more layers, each layer including bstores on the same hardware storage devices and the same nodes, Node 2 and Node 3. In such embodiments, it may be desirable to compact the multiple layers into a single layer for improved performance and space utilization in the data storage system. Accordingly, data between bstore IDs in two adjoining layers on the same hardware storage device can be merged in a third data location on the same hardware storage device. For example, in FIG. 12A, B5 1208 and B6 1204 are located on Node 2, Disc 3, and B7 1210 and B27 are both located on Node 3, Disc 2. In order to minimize the layers used and space utilized, these blocks can be merged. In some embodiments, however, the two adjoining layers may not to be fully merged into a third data location; rather, the data blocks may remain in-place and a new tree may be created. Thus, the underlying bstores may share some data blocks with overlying bstores.

FIG. 12B shows the merge 1212 of the data from bstore B5 and B6 on Node 2, Disc 3, and the merge 1214 of data from bstore B7 and B27 on Node 3, Disc 2. Because the merging of the bstore data is performed in the background, no new bstore is created or corresponding bstore ID has been allocated for the data yet. Accordingly, this merged data is not logically known and does not appear in the pb-map 1200.

In FIG. 12C, a new bstore is created on both Node 2 and Node 4. Bstore B11 is created on node 2, which is the merger of bstores B5 and B6, and new bstore B12 is created on node 3, which is the merger of bstores B7 and B27. Once the new bstores, B11 1216 and B12 1218, are created and new bstore IDs are allocated to those new bstores. The pb-map is then updated to include a single layer referencing the allocated bstore IDs associated with the new bstores B11 and B12. The merged bstores IDs (i.e., B5, B6, B7, B27) and layer 2 are removed from the pb-map and the corresponding bstores are deleted from disc.

FIGS. 13A-13F show an example in which an entry for a pstore ID in a pb-map and bstores on different nodes are both changed in response to a move of a pstore from one pair of nodes to another pair of nodes. In some embodiments, data is moved between hardware storage devices to facilitate load balancing, the introduction, and/or retirement of nodes from a cluster in a clustered or other data storage system. By using the address abstraction layer and logically pushing new layers into the pb-map, these movements to be done without the need for globally locking the system. Accordingly, new data can still be written to any logical address in the system while the data at the corresponding physical address is being moved or merged in a background process.

FIGS. 13A-13F show an example in which all bstores contained by a pstore are moved to different nodes in a way that permits them to be written to at any point throughout the moving process.

Figure 13A:
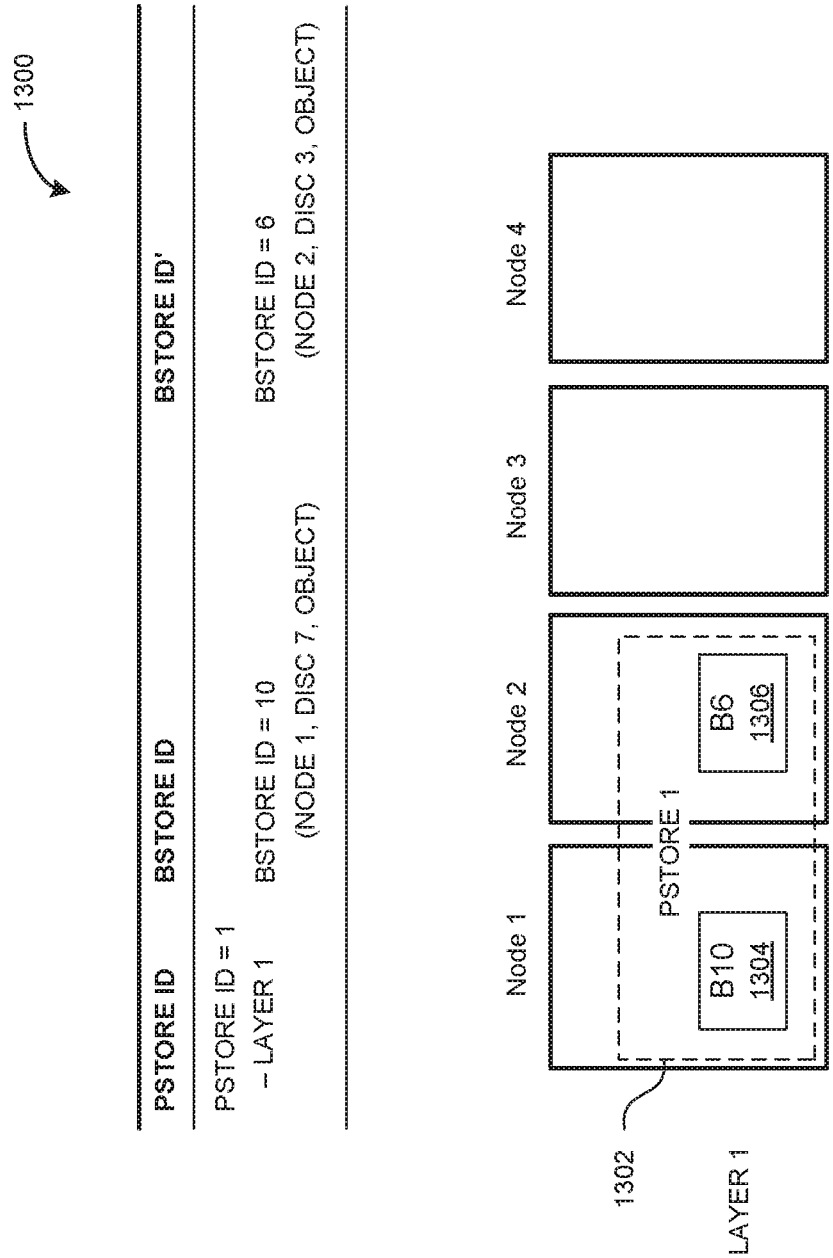
FIGS. 13A-13F show a pstore to bstore map (pb-map) for a pstore with an underlying block diagram of the corresponding pstore as stored in the facility when block storage units are moved and then merged on the same node.

FIG. 13A, shows pstore ID=1 (pstore1) having a single layer with bstores located on node 1 and node 2. The process of moving an entire pstore, and, consequently, its bstores (B10 1304 and B6 1306) to different nodes (Node 3 and Node 4) while also being able to continuously write to them is described in the steps illustrated in FIGS. 13B-13F.

Figure 13B:
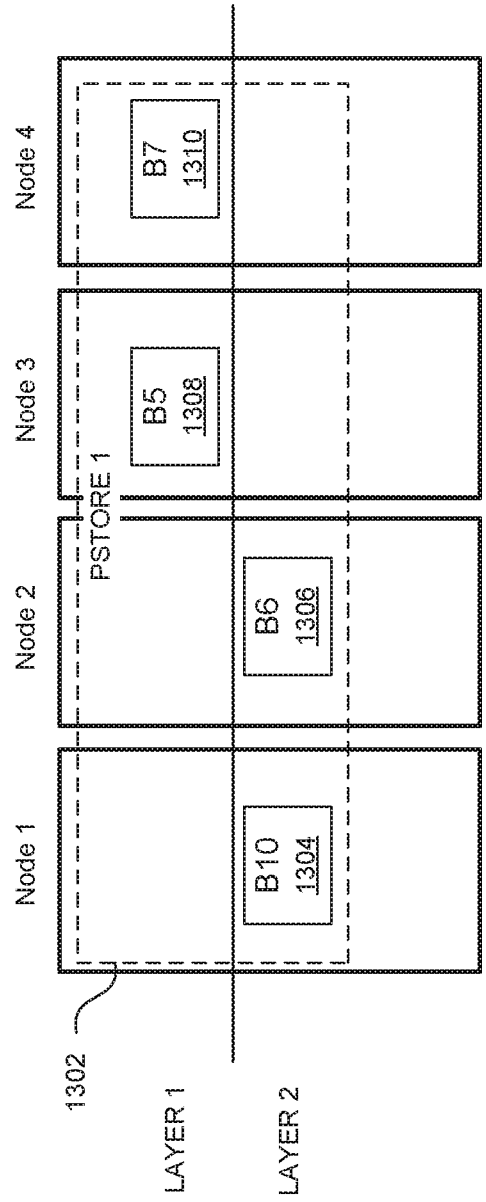

In FIG. 13B, the first step to move pstore1 to Node 3 and Node 4 is the addition of a new top layer, or layer 1, in the pb-map 1300 for that particular pstore ID. The new layer includes references to bstores located on the hardware storage devices to which the pstore is being moved. For example, layer 1 now includes bstore B5 1308 and B7 1310 on Node 3 and Node 4, respectively. Once the new layer 1 is added, any new writes directed to bstores B10 and B6 will subsequently be received at those new locations.

Figure 13C:
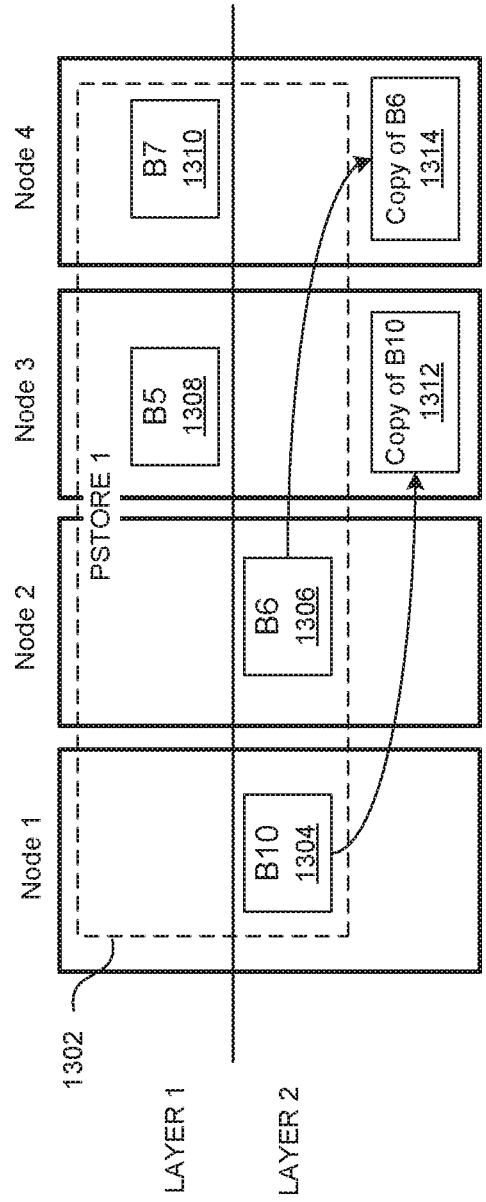

Next, in FIG. 13C, the data stored in the bstores B10 and B6 in layer 2 of pstore 1 1302 is then copied in the background on the nodes and discs of the new bstore B5 and new bstore B7 locations. Additionally, references to copies-in-process of those bstores are maintained in-memory on the nodes of the new bstore B5 and new bstore B7. For example, old data associated with B10 1304 is copied to disc in bstore B5 and newly received data intended for B10 1304 is in bstore B5 1308 while a reference to the new bstore B5 is maintained in-memory.

Figure 13D:
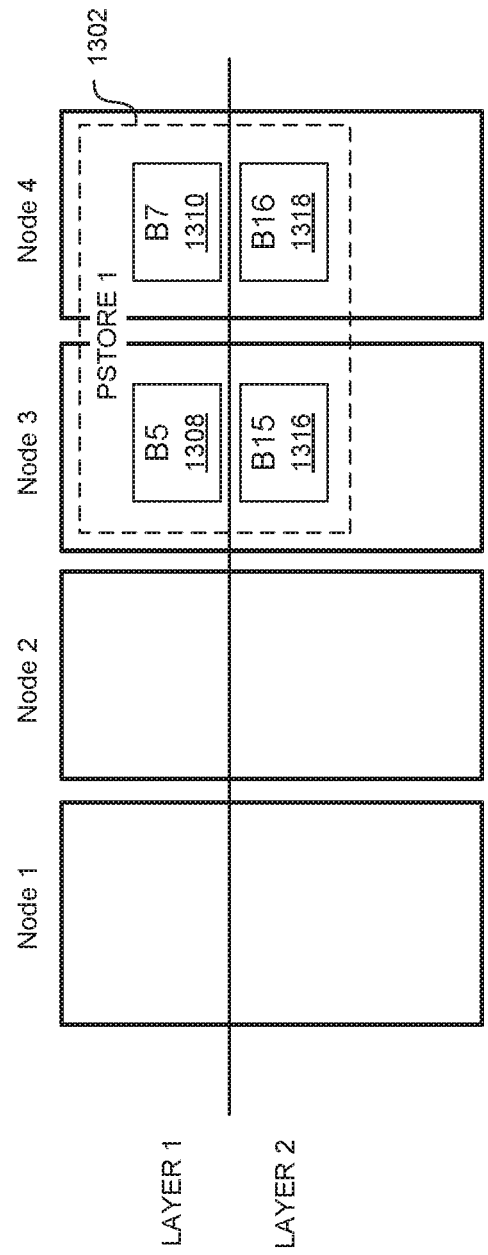

In FIG. 13D, the copied data from B10 is then copied from Node 3 to new bstore B15 1316 on Node 3 and the copied data from B6 on Node 4 is copied to new bstore B16 1318 on Node 4. New bstore IDs are then allocated for the bstores and the pb-map 1300 is updated replacing the previous bstore IDs (B10 and B6) in layer 2 with the newly allocated bstore IDs (B15 and B16). At this point, all of the data for pstore1 is in the new location and the old bstores (B10 and B6) may be deleted from disc. In some embodiments, a move is initiated and bstores are copied to a new hardware location without the addition of a new top layer referencing bstores on the new hardware storage devices. In such embodiments, the data is locked and no new writes may occur. In some embodiments, the addition of a new top layer referencing bstores at the new location is delayed until a write to that pstore occurs. This can eliminate the addition of a new top layer for pstores receiving a low number of writes.

Figure 13E:
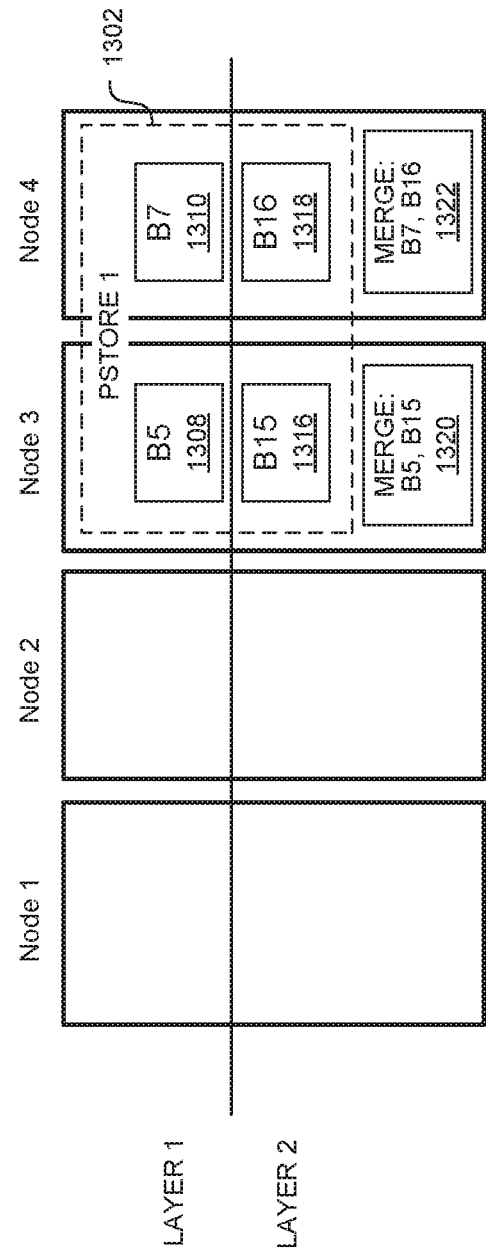

Referring now to FIG. 13E, after moving pstore1, it may be desirable to compact multiple layers of data into a single layer for improved performance and space utilization in the data storage system. Accordingly, the bstores on differing layers and the same nodes within pstore1 may be merged (e.g., 1320 and 1322) on those nodes. Since, for example, the data located in B5 is the new writes to B15, the bstore offsets of the data should not interfere with one another during the merge. However, if the data is written at the same offset in both layer 1 including B5 and layer 2 including B15, the data located in the upper layer (layer1) will override the data in the lower layer during the merge.

Figure 13F:
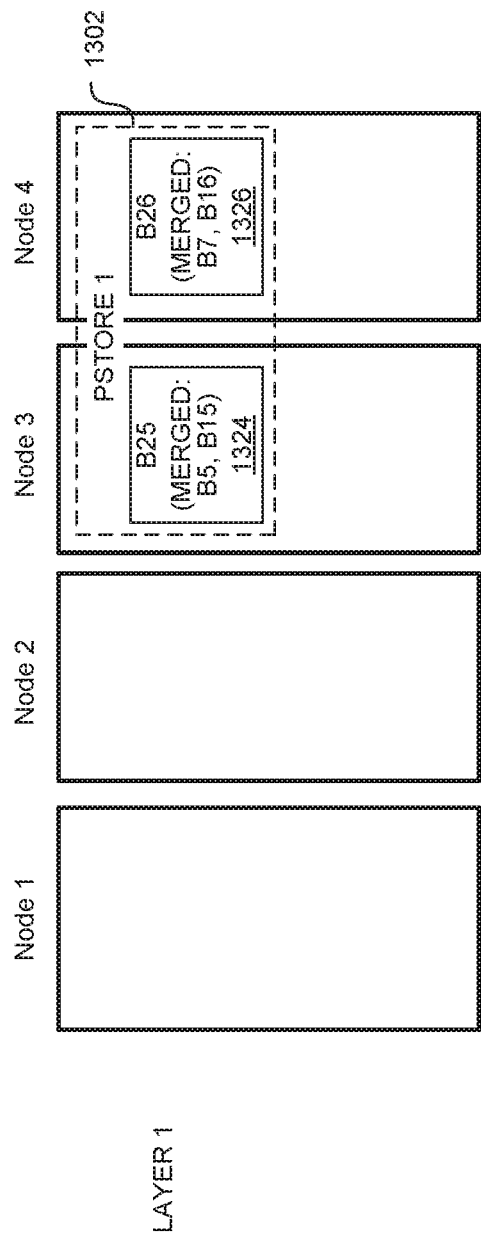

In FIG. 13F, new bstores B25 1324 and B26 1326 are created on Node 3 and Node 4, respectively, to receive the merged data from each of those nodes. Node 3 now includes a new bstore B25 1324 populated by the merged data of bstore B5 and bstore B15. Node 4 now includes a new bstore B26 1326 populated by the merged data of bstore B7 and bstore B16. Once the data has been successfully merged in the new bstores, (B25 and B26) new bstore IDs are allocated for the new bstores and the pb-map updated. The pb-map 1300 now includes a single top layer referencing the new bstore IDs as shown in FIG. 13F. While this example shows merging only two bstores it should be understood that any number of bstores could be merged together into a single bstore.

In the examples above, new bstores are created in which to merge data. However, this is merely illustrative and not intended to be limiting. Other variations may comprise merging data from a lower layer into an upper layer, reassigning the bstore ID offset in the upper layer to point to the new bstore rather than allocating a new bstore ID.

While only a few embodiments of the present invention have been shown and described, it will be obvious to those skilled in the art that many changes and modifications may be made thereto without departing from the spirit and scope of the present disclosure as described in the following claims. All patent applications and patents, both foreign and domestic, and all other publications referenced herein are incorporated herein in their entireties to the full extent permitted by law.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A data storage system for providing access to data in a file system over a network, comprising:
   a plurality of data storage devices; and
   one or more computers, including:
      one or more memories for storing instructions; and
      one or more processors that execute the instructions to perform actions, including:
         accessing data stored in a plurality of storage units, wherein each storage unit includes a plurality of block storage units (bstore), and wherein the file system employs one or more received write requests to select one or more of the plurality of storage units as protected storage units (pstore);
         providing a map for each pstore and two or more corresponding bstores, wherein the map associates an address with each pstore, and wherein the one or more received write requests and associated pstore address are employed to access one or more of the two of more corresponding bstores;
         persistently storing metrics of aggregated values at each directory that corresponds to at least one file object
         employing each received write request to generate one or more translated write requests, wherein each translated write request indicates a different one of the corresponding bstores; and
         in response to unavailability of the different one of the two or more bstores, performing further actions, including:
            generating a cleaning kit at an available bstore on a node that is separate from the one different unavailable bstore on another node, wherein the cleaning kit includes each in-flight transaction that is uncommitted to one or more bstores;
            adding a new bstore to an available data storage device containing the one different unavailable bstore, wherein the new bstore stores data intended for the unavailable bstore that is provided by the cleaning kit; and updating the unavailable bstore with data included in the new bstore when the unavailable bstore is available.

2. The data storage system of claim 1, further comprising:
collectively representing each translated write requests, as being positive or negative based on one or more commit responses provided by the one or more of the corresponding bstores.

3. The data storage system of claim 1, wherein providing the map further comprises including a copy of the map in an address abstraction layer that also includes an address for each pstore, and wherein the address abstraction layer communicates with a kernel layer that employs the received write request and associated pstore address to access one or more of the corresponding bstores.

4. The data storage system of claim 1, further comprising:
employing the receiving of each write request by the two or more bstores to subsequently provide corresponding commit requests to the two or more bstores without receiving acknowledgment for each write request.

5. The data storage system of claim 1, further comprising:
employing a null or unknown commit response from one or more bstores to provide the cleaning kit that includes data to bring the one or more bstores back to a known state, wherein the included data is less than a full backup copy of the bstore.

6. The data storage system of claim 1, further comprising:
writing one or more commit requests to a write ahead log for each corresponding bstore.

7. The data storage system of claim 1, further comprising:
in response to a startup state, designating one node to query each bstore for a list of each log entry for each corresponding write ahead log, wherein the list is employed to build a transaction status table.

8. A method for providing access to stored data over a network, comprising:
employing one or more processors to execute instructions to perform actions, including:
accessing data stored in a plurality of storage units, wherein each storage unit includes a plurality of block storage units (bstore), and wherein the file system employs one or more received write requests to select one or more of the plurality of storage units as protected storage units (pstore);
providing a map for each pstore and two or more corresponding bstores, wherein the map associates an address with each pstore, and wherein the one or more received write requests and associated pstore address are employed to access one or more of the two of more corresponding bstores;
employing each received write request to generate one or more translated write requests, wherein each translated write request indicates a different one of the corresponding bstores; and
in response to unavailability of the different one of the two or more bstores, performing further actions, including:
generating a cleaning kit at an available bstore on a node that is separate from the one different unavailable bstore on another node, wherein the cleaning kit includes each in-flight transaction that is uncommitted to one or more bstores;
adding a new bstore to an available data storage device containing the one different unavailable bstore, wherein the new bstore stores data intended for the unavailable bstore that is provided by the cleaning kit; and updating the unavailable bstore with data included in the new bstore when the unavailable bstore is available.

9. The method of claim 8, further comprising:
collectively representing each translated write requests, as being positive or negative based on one or more commit responses provided by the one or more of the corresponding bstores.

10. The method of claim 8, wherein providing the map further comprises including a copy of the map in an address abstraction layer that also includes an address for each pstore, and wherein the address abstraction layer communicates with a kernel layer that employs the received write request and associated pstore address to access one or more of the corresponding bstores.

11. The method of claim 8, further comprising:
employing the receiving of each write request by the two or more bstores to subsequently provide corresponding commit requests to the two or more bstores without receiving acknowledgment for each write request.

12. The method of claim 8, further comprising:
employing a null or unknown commit response from one or more bstores to provide the cleaning kit that includes data to bring the one or more bstores back to a known state, wherein the included data is less than a full backup copy of the bstore.

13. The method of claim 8, further comprising:
writing one or more commit requests to a write ahead log for each corresponding bstore.

14. The method of claim 8, further comprising:
in response to a startup state, designating one node to query each bstore for a list of each log entry for each corresponding write ahead log, wherein the list is employed to build a transaction status table.

15. A non-transitory data storage media that includes instructions for providing access to stored data over a network, wherein execution of the instructions by one or more processors performs actions, including:
accessing data stored in a plurality of storage units, wherein each storage unit includes a plurality of block storage units (bstore), and wherein the file system employs one or more received write requests to select one or more of the plurality of storage units as protected storage units (pstore);
providing a map for each pstore and two or more corresponding bstores, wherein the map associates an address with each pstore, and wherein the one or more received write requests and associated pstore address are employed to access one or more of the two of more corresponding bstores;
employing each received write request to generate one or more translated write requests, wherein each translated write request indicates a different one of the corresponding bstores; and
in response to unavailability of the different one of the two or more bstores, performing further actions, including:
generating a cleaning kit at an available bstore on a node that is separate from the one different unavailable bstore on another node, wherein the cleaning kit includes each in-flight transaction that is uncommitted to one or more bstores;
adding a new bstore to an available data storage device containing the one different unavailable bstore, wherein the new bstore stores data intended for the unavailable bstore that is provided by the cleaning kit; and updating the unavailable bstore with data included in the new bstore when the unavailable bstore is available.

16. The non-transitory storage media of claim 15, further comprising:
collectively representing each translated write requests, as being positive or negative based on one or more commit responses provided by the one or more of the corresponding bstores.

17. The non-transitory storage media of claim 15, wherein providing the map further comprises including a copy of the map in an address abstraction layer that also includes an address for each pstore, and wherein the address abstraction layer communicates with a kernel layer that employs the received write request and associated pstore address to access one or more of the corresponding bstores.

18. The non-transitory storage media of claim 15, further comprising:
employing the receiving of each write request by the two or more bstores to subsequently provide corresponding commit requests to the two or more bstores without receiving acknowledgment for each write request.

19. The non-transitory storage media of claim 15, further comprising:
employing a null or unknown commit response from one or more bstores to provide the cleaning kit that includes data to bring the one or more bstores back to a known state, wherein the included data is less than a full backup copy of the bstore.

20. The non-transitory storage media of claim 15, further comprising:
in response to a startup state, designating one node to query each bstore for a list of each log entry for each corresponding write ahead log, wherein the list is employed to build a transaction status table.

* * * * *